(12) United States Patent
Lin

(10) Patent No.: US 12,280,927 B2
(45) Date of Patent: Apr. 22, 2025

(54) LID STRUCTURE OF PORTABLE CONTAINER

(71) Applicant: Ming-Te Lin, Taipei (TW)

(72) Inventor: Ming-Te Lin, Taipei (TW)

( * ) Notice: Subject to any disclaimer, the term of this patent is extended or adjusted under 35 U.S.C. 154(b) by 496 days.

(21) Appl. No.: 17/618,228

(22) PCT Filed: Jun. 12, 2019

(86) PCT No.: PCT/CN2019/090908
§ 371 (c)(1),
(2) Date: Dec. 10, 2021

(87) PCT Pub. No.: WO2020/248162
PCT Pub. Date: Dec. 17, 2020

(65) Prior Publication Data
US 2022/0219872 A1      Jul. 14, 2022

(51) Int. Cl.
*B65D 51/28*     (2006.01)
*A47G 19/22*     (2006.01)

(52) U.S. Cl.
CPC ..... *B65D 51/2807* (2013.01); *A47G 19/2272* (2013.01)

(58) Field of Classification Search
CPC .................. B65D 51/2807; A47G 19/2272
USPC ........................................................... 426/86
See application file for complete search history.

(56) References Cited

U.S. PATENT DOCUMENTS

| | | |
|---|---|---|
| 6,269,736 B1 | 8/2001 | Melton |
| 2014/0042158 A1 | 2/2014 | Witkowski et al. |
| 2016/0009465 A1 | 1/2016 | Pan |

FOREIGN PATENT DOCUMENTS

| | | | |
|---|---|---|---|
| CN | 1749127 A | | 3/2006 |
| CN | 201641394 U | | 11/2010 |
| CN | 202006952 U | | 10/2011 |
| CN | 106551574 A | * | 4/2017 |
| DE | 202008015588 U1 | | 3/2009 |
| EP | 3575241 A1 | | 12/2019 |
| JP | H09135721 A | | 5/1997 |
| JP | 3077810 U | | 6/2001 |
| JP | 3154863 U | | 10/2009 |
| JP | 3197956 U | | 6/2015 |
| TW | M541993 U | * | 5/2017 |

OTHER PUBLICATIONS

Translation of CN-106551574-A (Year: 2017).*
Translation of TW-M541993-U (Year: 2017).*

* cited by examiner

*Primary Examiner* — Brent T O'Hern
(74) *Attorney, Agent, or Firm* — Muncy, Geissler, Olds & Lowe, P.C.

(57) ABSTRACT

A lid structure comprises an edible first part. The first part comprises a bottom portion and an annular wall. The annular wall extends from the periphery of the bottom portion in a direction having an inclined angle with the bottom portion. The bottom portion and the annular wall define an accommodating space, and the outer periphery of the annular wall is provided with at least one first opening. The lid structure further comprises a second part provided with a third opening and covering the first part, with the accommodating space facing the second part, and the at least one first opening and the third opening being located on opposite sides of the bottom portion, respectively. A portable container comprising a container part and the lid structure is also provided.

15 Claims, 28 Drawing Sheets

LID STRUCTURE OF PORTABLE CONTAINER

BACKGROUND

Technology Field

The present disclosure relates to a portable container and a lid structure thereof. In particular, this disclosure relates to a portable container for preparing beverage and a lid structure thereof including an edible part.

Description of Related Art

Most of the conventional eco-friendly containers (portable containers) on the market only have the function of containing water or beverage for drinking. When using the eco-friendly containers to drink tea or coffee, most people use portable tea bags or coffee bags to brew so as to prepare the beverage. In this way, the consumers must purchase the portable containers and the tea bags or coffee bags at the same time. When preparing the beverage, the consumer needs to tear off the package of the tea bag or coffee bag, put the tea bag or pour the coffee powder from the package into the eco-friendly container, and then pour ice water or boiled water into the eco-friendly container for the purpose of brewing tea or coffee. This pstore the tea bags or coffee bags. In addition, this method can only allow the drinker to drink the beverage contained or brewed in the container, and the drinker cannot simultaneously enjoy beverages of different flavors in the same eco-friendly container. If the drinker wants to enjoy a snack, he/she needs to bring the snack additionally to accompany with the prepared beverage.

In addition, freshly brewed or filled beverages are often too cold or too hot for the drinker. However, the drinker may not recognize the exact temperature of the beverage by touching the container when the beverage is placed in the container, so the drinker may be easily scalded inadvertently. Moreover, even if the drinker has noticed that the beverage is too cold or too hot, he/she still has to sip the beverage or wait a long time until the temperature of the beverage rises or drops to a temperature suitable for drinking. If the waiting time is too long, the temperature of the beverage will change too much, so the drinker may not enjoy the beverage of the desired temperature. This is very inconvenient.

Furthermore, when using the eco-friendly container, if the user carries it carelessly or the container receives a collision, the liquid in the container may be spilled, which will not only cause waste, but also cause inconvenience to the drinker.

Therefore, it is an important subject to provide a portable container and a lid structure thereof that can adjust the temperature and flavor of the beverage in the container based on the design of the lid structure, so that the drinker can enjoy the beverage of different flavors with a proper temperature, thereby enhancing the convenience in drinking. In addition, the lid structure can provide a snack so as to increase the fun of drinking. Moreover, based on the design of the lid structure, the structure of the portable container can be strengthened so as to prevent liquid from leaking out and make it easy to carry.

SUMMARY

An objective of this disclosure is to provide a portable container and a lid structure thereof. Compared to the conventional art, due to the design of the lid structure of this disclosure, a part of the beverage can be retained in the lid structure according to personal preference, and the flavor and temperature of the beverage in the container can be adjusted by the period of retention time. Thus, the drinker can drink different flavor beverages with the appropriate temperature by sips or batches, and this can increase the convenience and fun of drinking. In addition, a part of the lid structure is edible, and the drinker can directly take it as a snack after drinking, which can add the fun to drinking. Moreover, the lid structure can be used to strengthen the structure of the portable container, prevent liquid from spilling out, and make it easier to carry.

To achieve the above objective, this disclosure provides a lid structure of a portable container, which comprises an edible first part. The first part comprises a bottom portion and an annular wall. The annular wall extends from a periphery of the bottom portion in a direction having an inclined angle with the bottom portion. The bottom portion and the annular wall form an accommodating space. An outer periphery of the annular wall is configured with at least one first opening.

In one embodiment, the first part further comprises at least one edible and soluble flavor portion, and the at least one flavor portion is provided on at least a part of an inner surface of the bottom portion and/or the annular wall facing the accommodating space.

In one embodiment, the first part further comprises at least one recess portion, the at least one recess portion is formed on the inner surface of the bottom portion and/or the annular wall facing the accommodating space, and the at least one flavor portion is disposed in the recess portion.

In one embodiment, the first part further comprises a groove configured on at least a part of the outer periphery of the annular wall away from the accommodating space and the bottom portion.

In one embodiment, the first part further comprises a partition portion, the partition portion is configured on the inner surface of the bottom portion facing the accommodating space, and two ends of the partition portion connect to the annular wall for separating the accommodating space into a first accommodating space and a second accommodating space.

In one embodiment, the first part comprises at least two flavor portions, and the at least two flavor portions are arranged in the first accommodating space and the second accommodating space, respectively.

In one embodiment, the outer periphery of the annular wall is configured with a first opening, and the first opening is arranged corresponding to the partition portion; or the outer periphery of the annular wall is configured with two first openings, and the first openings are arranged corresponding to the first accommodating space and the second accommodating space, respectively.

In one embodiment, the outer periphery of the annular wall comprises at least one second opening.

In one embodiment, the lid structure further comprises a second part. The second part has a third opening, and the second part covers the first part. The accommodating space opens toward the second part. The at least one first opening and the third opening are located at opposite sides of the bottom portion, respectively.

To achieve the above objective, the present disclosure also provides a portable container, which comprises a containing portion and the above-mentioned lid structure. The first part covers an inner periphery of the containing portion close to a rim of the containing portion, and the second part covers an outer periphery of the rim.

To achieve the above objective, the present disclosure also provides a portable container, which comprises a containing portion and the above-mentioned lid structure. The first part is connected to an inner surface of the second part, and the second part covers the outer periphery of the rim of the containing portion.

As mentioned above, due to the design of the lid structure of this disclosure, a part of the beverage can be retained in the lid structure according to personal preference, and the flavor and temperature of the beverage in the container can be adjusted by the period of retention time. Thus, the drinker can drink different flavor beverages with the appropriate temperature by sips or batches, and this can increase the convenience and fun of drinking. In addition, a part of the lid structure is edible, and the drinker can directly take it as a snack after drinking, which can add the fun to drinking. Moreover, the lid structure can be used to strengthen the structure of the portable container, prevent liquid from spilling out, and make it easier to carry.

DETAILED DESCRIPTION OF THE DISCLOSURE

Hereinafter, the preferred embodiments of the portable container and the lid structure according to the present disclosure will be described with reference to the relevant drawings, wherein the same components will be described with the same reference numbers.

The portable container and the lid structure of this disclosure can, based on the design of the lid structure, retain a part of the beverage in the lid structure according to personal preference, and the flavor and temperature of the beverage in the container can be adjusted by the period of retention time. Thus, the drinker can drink different flavor beverages with the appropriate temperature by sips or batches, and this can increase the convenience and fun of drinking. In addition, a part of the lid structure is edible, and the drinker can directly take it as a snack after drinking, which can add the fun to drinking. Moreover, the lid structure can be used to strengthen the structure of the portable container, prevent liquid from spilling out, and make it easier to carry.

Figure 1A:
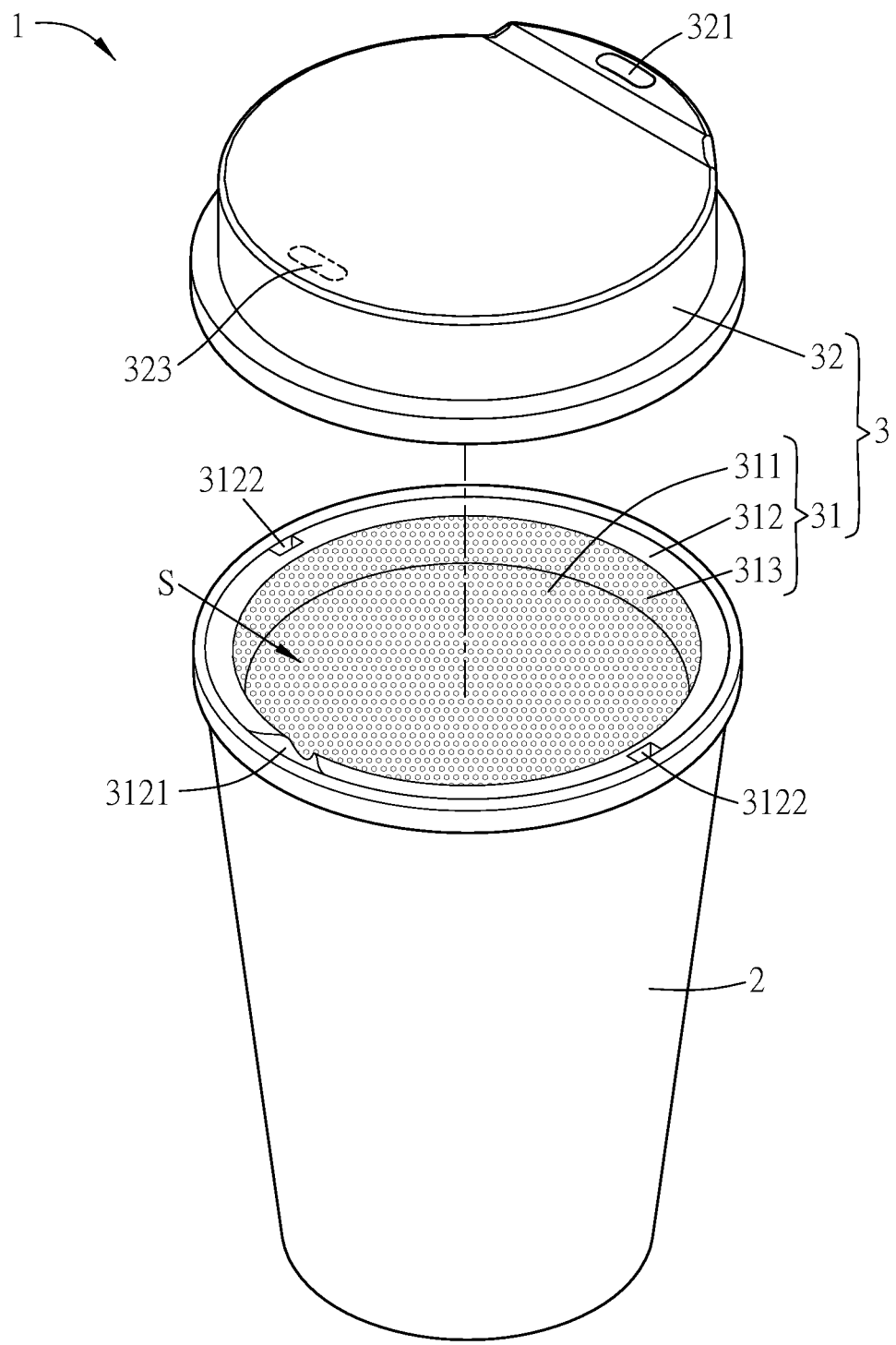
FIG. 1A is a schematic diagram showing a portable container according to a first embodiment of this disclosure, wherein the lid structure is applied to the containing portion.
Figure 1B:
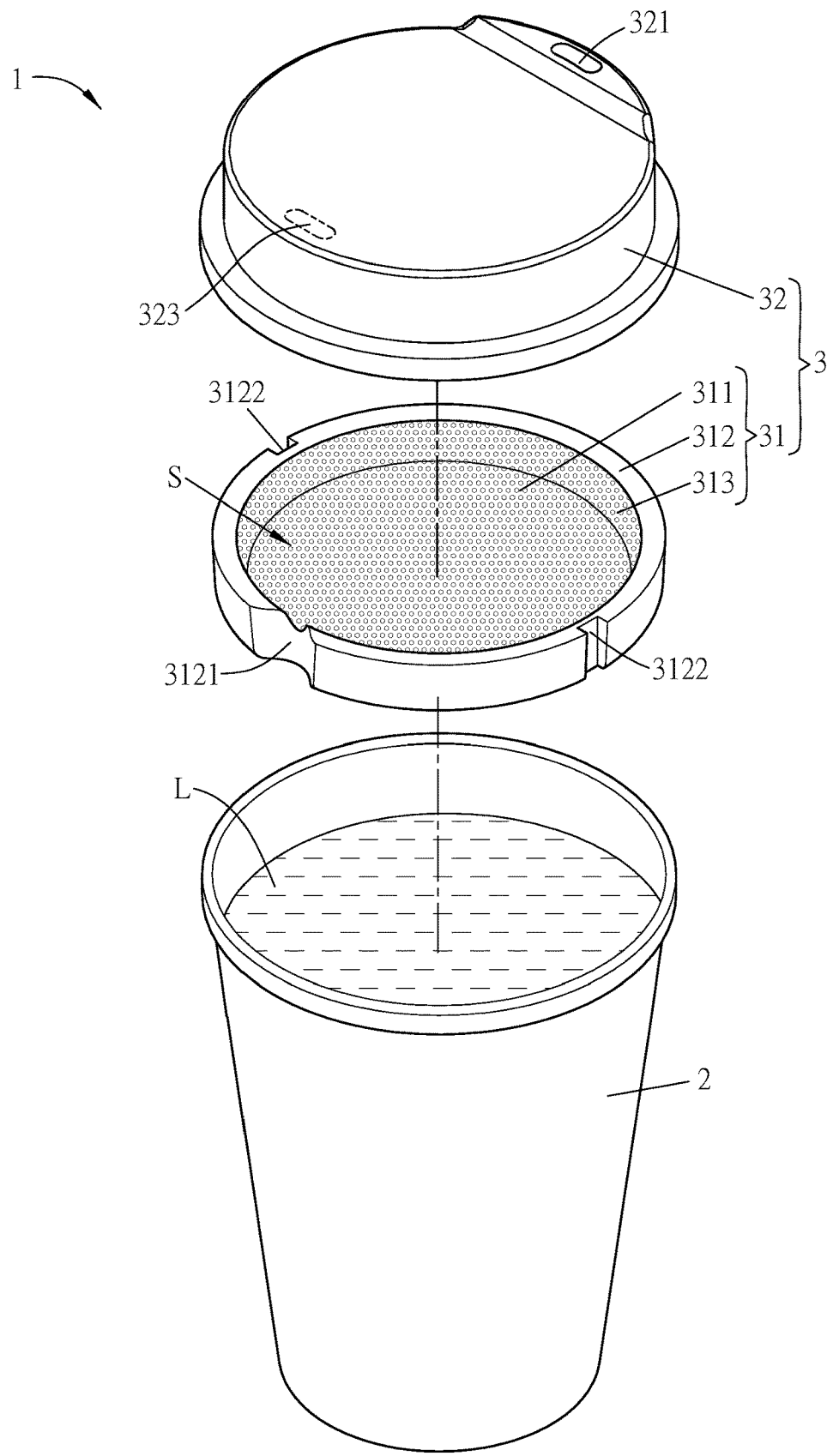
FIG. 1B is an exploded view of the lid structure and the containing portion of the portable container of FIG. 1A.

Please refer to FIGS. 1A and 1B, wherein FIG. 1A is a schematic diagram showing a portable container according to a first embodiment of this disclosure, where the lid structure is applied to the containing portion, and FIG. 1B is an exploded view of the lid structure and the containing portion of the portable container of FIG. 1A. As shown in FIG. 1A, the portable container 1 of this disclosure comprises a containing portion 2 and a lid structure 3. The lid structure 3 comprises an edible first part 31. The lid structure 3 further comprises a second part 32, which covers the first part 31.

Figure 1C:
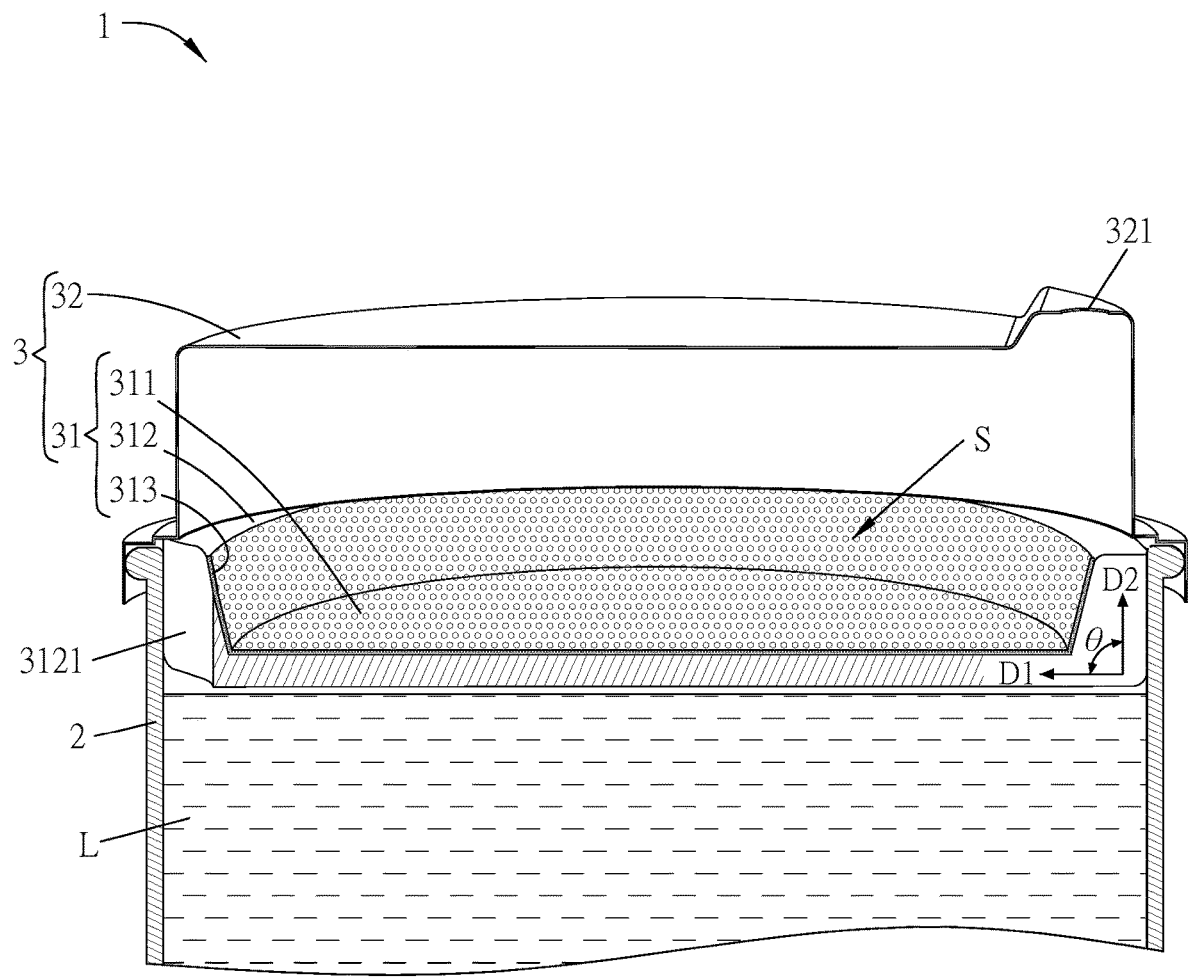
FIG. 1C is a sectional view of the assembled portable container of FIG. 1A.

Please refer to FIG. 1C, wherein FIG. 1C is a sectional view of the assembled portable container of FIG. 1A. The first part 31 can cover an inner periphery of the containing portion 2 close to a rim of the containing portion 2, and the second part 32 can cover an outer periphery of the rim. The portable container can be, for example but not limited to, an eco-friendly container (including the disposable container or the reusable container).

Figure 1D:
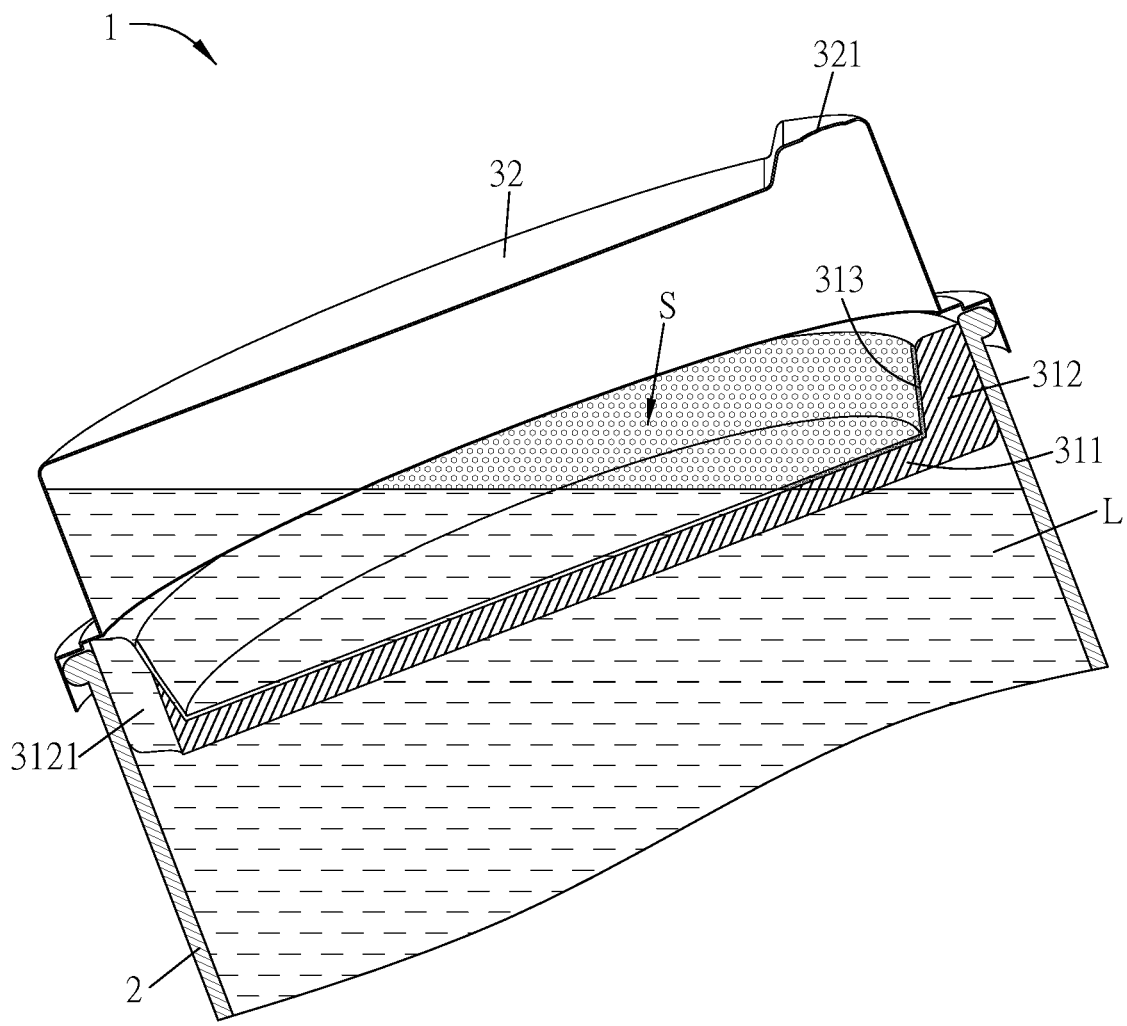
FIG. 1D to FIG. 1E are schematic diagram showing the continuous operations in drinking status of the portable container of FIG. 1C.
Figure 1E:
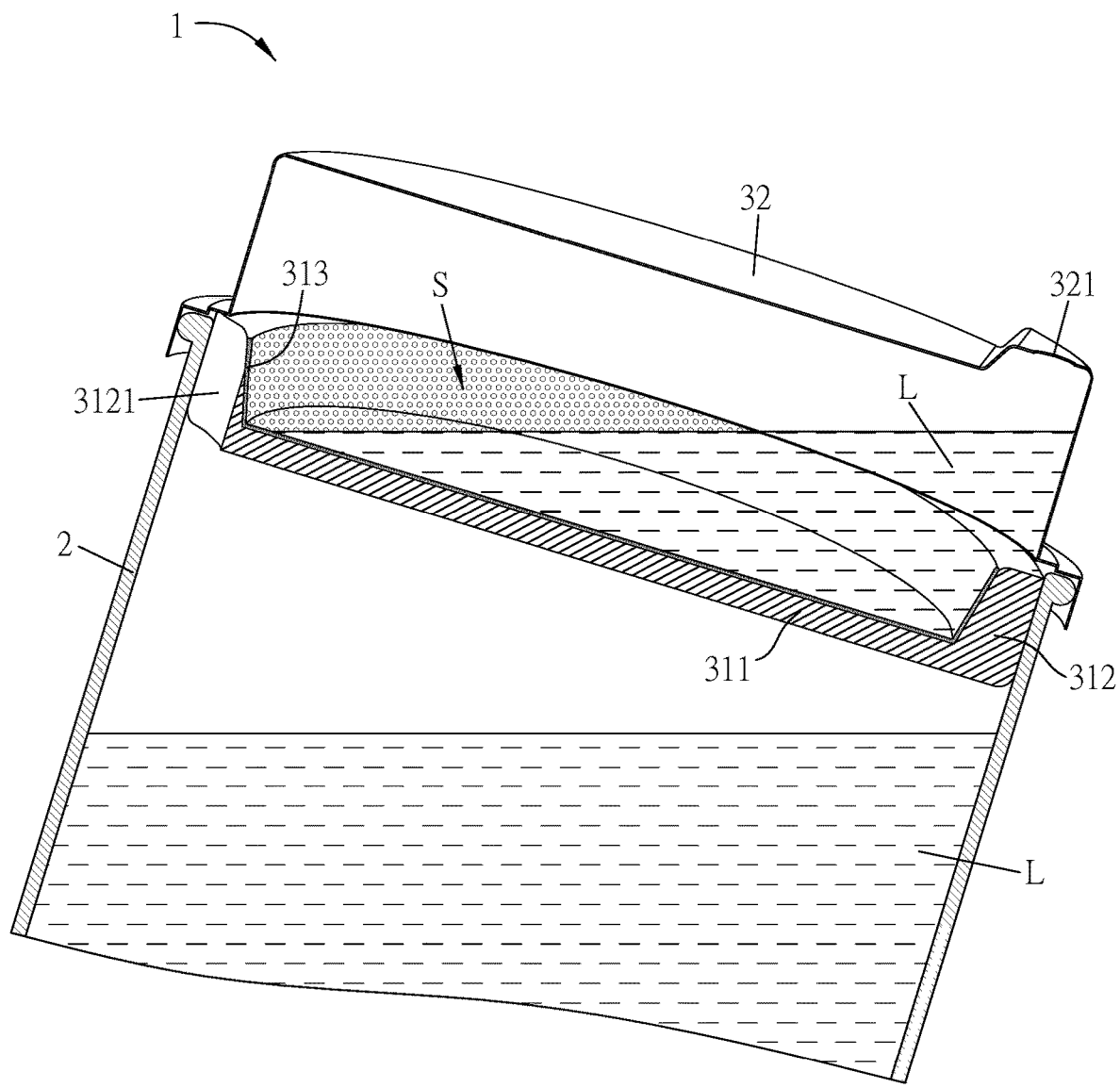
Figure 1F:
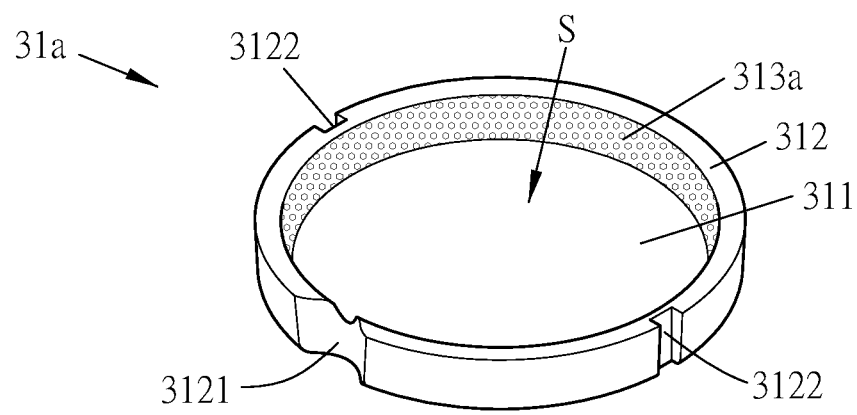
FIG. 1F to FIG. 1I are schematic diagrams showing other aspects of the lid structure of the portable container of FIG. 1B.
Figure 1G:
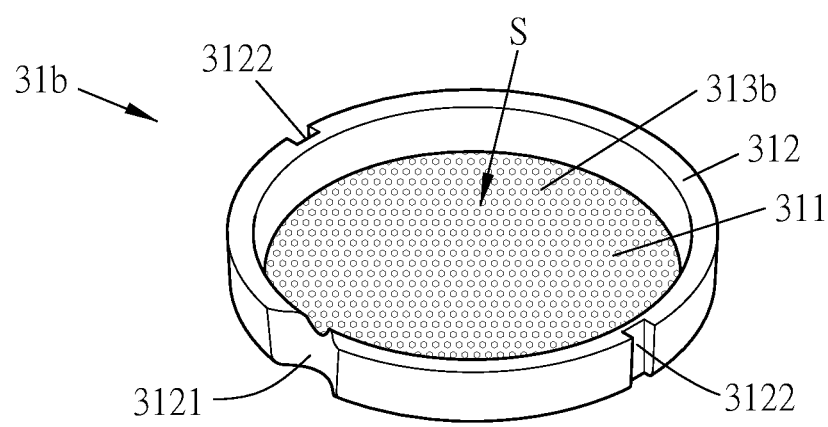
Figure 1H:
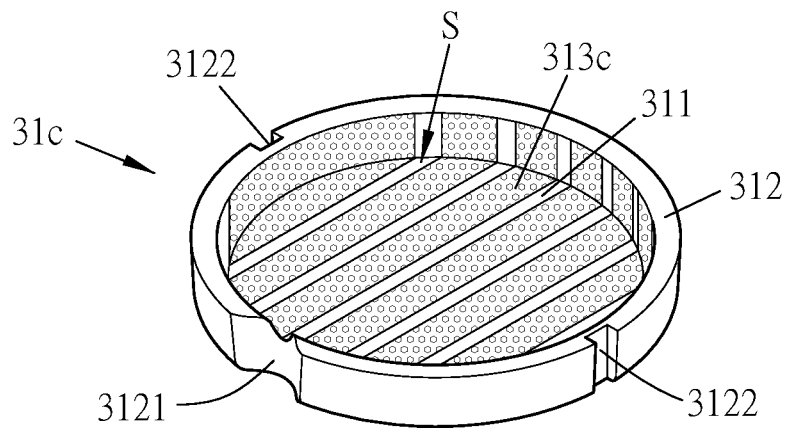
Figure 1I:
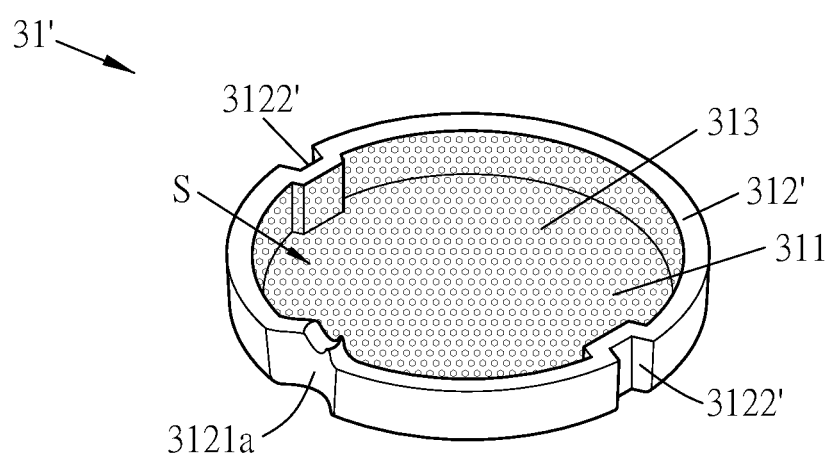

Please refer to FIGS. 1A to 1C and FIG. 1I, wherein FIG. 1I is a schematic diagram showing another aspect of the lid structure of the portable container of FIG. 1B. In this embodiment, the first part 31 comprises a bottom portion 311 and an annular wall 312. The annular wall 312 extends from a periphery of the bottom portion 311 in a direction D2 having an inclined angle θ with the bottom portion 311. The bottom portion 311 and the annular wall 312 form an accommodating space S. An outer periphery of the annular wall 312 is configured with at least one first opening 3121. As shown in FIG. 1B, the outer periphery of the annular wall 312 is formed with a first opening 3121, wherein the thickness of the part of the annular wall 312 formed with the first opening 3121 is thinner than the thickness of the part of the annular wall 312 not formed with the first opening 3121. That is, the first opening 3121 is formed by cutting off a part of the annular wall 312. Alternatively, as shown in FIG. 1I, the outer periphery of the annular wall 312' of the first part 31' is configured with a first opening 3121a, and the entire annular wall 312' has a uniform thickness. That is, the first opening 3121a is formed by curving a part of the annular wall 312' toward the accommodating space S. In addition, as shown in FIG. 1C, the bottom portion extends in a direction D1, and the annular wall 312 extends from a periphery of the bottom portion 311 in a direction D2 having an inclined angle θ with the direction D1. The bottom portion 311 and the annular wall 312 form an accommodating space S, and the accommodating space S opens toward the second part 32. In particular, FIG. 1C shows that the inclined angle θ is 90 degrees. However, the inclined angle θ can be, for example but not limited to, 45 degrees, 60 degrees, 70 degrees, 80 degrees, or any value that allows the bottom portion 311 and the annular wall 312 to form the accommodating space S, and this disclosure is not limited thereto. In addition, FIG. 1B shows that the outer periphery of the annular wall 312 is formed with one first opening 3121. However, the number and arrangement of the first opening(s) 3121 can be changed based on the requirement of users. Any configuration that can prevent the situation that the first opening 3121 penetrates from the outer periphery of the annular wall 312 to the inner surface thereof, and thus ensure that the accommodating space S formed by the annular wall 312 and the bottom portion 311 can have the function of holding the liquid L is acceptable, and this disclosure is not limited. Moreover, the figures show that the upper edge of the annular wall 312 is a circular wall. However, the upper edge of the annular wall 312 can also be a quadrilateral, triangular or polygonal wall, or any shape that allows the annular wall 312 and the bottom portion 311 to form the accommodating space S and allows the first part 31 to cover the inner periphery of the containing portion 2 close to the rim of the containing portion 2. This disclosure is not limited.

Referring to FIGS. 1A to 1C and FIG. 1I, in this embodiment, the outer periphery of the annular wall 312 of the first part 31 comprises at least one second opening 3122, the second part 32 has a third opening 321, and the at least one first opening 3121 and the third opening 321 are located at opposite sides of the bottom portion 311, respectively. The functions of the first opening 3121, the second opening 3122 and the third opening 321 will be described hereinafter, and the details thereof are not described here. For example, as shown in FIG. 1B, the outer periphery of the annular wall 312 is formed with two second openings 3122, wherein the thicknesses of the parts of the annular wall 312 formed with the second openings 3122 are thinner than the thickness of the part of the annular wall 312 not formed with the second opening 3122. That is, each second opening 3122 is formed by cutting off a part of the annular wall 312. Alternatively, as shown in FIG. 1I, the outer periphery of the annular wall 312' of the first part 31' is configured with two second openings 3122', and the entire annular wall 312' has a uniform thickness. That is, each second opening 3122' is formed by curving a part of the annular wall 312' toward the accommodating space S. In addition, FIG. 1B shows that the outer periphery of the annular wall 312 is formed with two second openings 3122. However, the number and arrangement of the second openings 3122 can be changed based on the requirement of users. Any configuration that can prevent the situation that the second opening 3122 penetrates from the outer periphery of the annular wall 312 to the inner surface thereof, and thus ensure that the accommodating space S formed by the annular wall 312 and the bottom portion 311 can have the function of holding the liquid L is acceptable, and this disclosure is not limited.

Please refer to FIG. 1B and FIGS. 1F to 1H, wherein FIGS. 1F to 1H are schematic diagrams showing other aspects of the lid structure of the portable container of FIG. 1B. In this embodiment, the first part 31 further comprises at least one edible and soluble flavor portion 313, and the at least one flavor portion 313 is provided on at least a part of an inner surface of the bottom portion 311 and/or the annular wall 312 facing the accommodating space S. For the sake of ease of description, the flavor portion 313 is represented by dots pattern. Although FIG. 1B shows that the flavor portion 313 of the first part 31 is provided on the entire inner surface of the bottom portion 311 and the annular wall 312 facing the accommodating space S, the flavor portion 313a of the first part 31a as shown in FIG. 1F is provided only on the inner surface of the annular wall 312 facing the accommodating space S; or the flavor portion 313b of the first part 31b as shown in FIG. 1G is provided only on the inner surface of the bottom portion 311 facing the accommodating space S; or the flavor portion 313c of the first part 31c as shown in FIG. 1H is provided only on a part of the inner surface of the bottom portion 311 and the annular wall 312 facing the accommodating space S. This disclosure is not limited thereto. The flavor portion 313, 313a, 313b or 313c can be selected from easily soluble biscuits, meringue, fondant, flavored ice cubes, liquid flavor packets, solid flavor packets, powder flavor packets, or a combination thereof. The flavor portions 313, 313a, 313b, and 313c can be provided on at least a part of the inner surfaces of the bottom portion 311 and/or the annular wall 312 facing the accommodating space S by baking, spraying, coating, printing, screen printing, placing, embedding, or sticking. For example, the edible and soluble flavor portions 313, 313a, 313b and 313c can be used to increase the flavor of the liquid L (liquid L is shown by the horizontal dashed line in the figure) when the drinker drinks. In addition, although FIG. 1H shows that the flavor portion 313c of the first part 31c is only provided on a part of the inner surface of the bottom portion 311 and the annular wall 312 facing the accommodating space S and has a stripe shape, the flavor portion 313c can also be provided in a special pattern such as, for example but not limited to, a text, latte art, flower, animal or cartoon character, which can be used in conjunction with a transparent second part 32 for increasing the visual interest while adjusting the flavor and temperature of the beverage.

The operations of utilizing the flavor portion to increase the flavor of the contained liquid in the portable container will be described hereinafter with reference to FIGS. 1C to 1E. FIG. 1D to FIG. 1E are schematic diagram showing the continuous operations in drinking status of the portable container of FIG. 1C. When the user wants to add the flavor of the flavor portion 313 to the liquid L in the container, the portable container 1 should first be tilted toward the first opening 3121 for a few seconds to allow the liquid L to flow into the accommodating space S (as shown in FIG. 1D). Then, the portable container can be returned to the stand-up position. At this time, the excess liquid L will flow from the second openings 3122 (referring to FIG. 1B, while the sectional views of FIGS. 1C to 1E do not show the second openings 3122) back to the inside of the containing portion 2. Since the flavor portion 313 is edible and soluble, after the liquid L flows into the accommodating space S, it will contact the flavor portion 313, so that the flavor portion 313 can be dissolved in the liquid L. Accordingly, the liquid L will be added with the flavor of the flavor portion 313. After that, the portable container 1 is directly tilted toward the third opening 321 (as shown in FIG. 1E), and the user can drink the liquid L added with the flavor of the flavor portion 313. For example, as shown in FIG. 1C, the liquid L is hot coffee, and the flavor portion 313 is chocolate, which can be arranged on the inner surface of the bottom portion 311 and the annular wall 312 facing the accommodating space S by spraying, coating or sticking. The user can proceed the continuous operations with the portable container in drinking status so as to make the hot coffee enter the accommodating space S of the first part 31 from the first opening 3121, and then shake the container or adjust the period of remaining the hot coffee in the accommodating space S based on personal taste. Accordingly, the chocolate is dissolved in the hot coffee, and then the hot coffee with a chocolate flavor (also called mocha coffee) can be provided from the third opening 321 of the second part 32. Here, although the liquid L is hot coffee and the flavor portion 313 is chocolate as an example for illustration, the liquid L can be cold or hot drink such as, for example but not limited to, water, coffee, milk, black tea, green tea, milk tea or any of other drinks. The flavor portion 313 can be, for example but not limited to, cinnamon, cardamom, hazelnut, vanilla powder, vanilla block, chocolate powder, brandy, lemon peel, orange peel, coconut milk, coconut milk, coconut oil, cream, birch mushroom, *ganoderma, cordyceps*, banana, blue-green seaweed, agave ginger syrup, turmeric powder, rosemary, honey, brown sugar, etc., or any of other materials with flavor function, or that material that can be added to beverage made of easily soluble biscuits, meringue, fondant, flavored ice cubes, liquid flavor packets, solid flavor packets, powder flavor packets or any of other easy-to-dissolve flavor combinations, and this disclosure is not limited thereto. The above-mentioned easily soluble biscuits, meringue, fondant, flavored ice cubes, liquid flavor packets, solid flavor packets, powder flavor packets, or a combination thereof can be provided on at least a part of the inner surfaces of the bottom portion 311 and/or the annular wall 312 facing the accommodating space S by baking, spraying, coating, printing, screen printing, placing, embedding, or sticking, and this disclosure is not limited thereto. That is, the type of liquid, the flavor and material of the flavor portion, the manner and range of arranging the flavor portion on at least a part of the inner surface of the bottom portion 311 and/or the annular wall 312 facing the accommodating space S can be made according to the needs of the user, and this disclosure is not limited thereto.

Referring to FIGS. 1C to 1E, in this embodiment, the first part 31 is an artificial edible starch body, such as, for example but not limited to, baked hard biscuits or dentifrice. In details, the artificial edible starch body of the first part 31 is not easy soluble, and the flavor part 313 of the first part 31 is soluble (easy soluble). Therefore, when the liquid L enters the accommodating space S of the first part 31 through the first opening 3121 of the first part 31, the flavor portion 313 can be dissolved in the liquid L (while retaining the edible starch body), and the user can drink the flavored liquid L containing the flavor portion 313 from the third opening 321 of the second part 32. After the user finishes the beverage, he/she can take the first part 31 (the edible starch body) to eat directly. This not only can enjoy different flavored beverages, but also can enjoy flavored biscuits soaked in a drink so as to add fun. Particularly, the first part 31 not only comprises the flavor portion 313 to add flavor to the liquid L and can also be directly ate, but also has the function of maintaining and adjusting the temperature of the liquid L. When the liquid L enters the accommodating space S of the first part 31 from the opening 3121 of the first part 31, a part of the liquid L can be allowed to stay in the accommodating space S to isolate it from the most part of liquid L in the containing portion 2, thereby adjusting the temperature of the liquid L in the accommodation space S and maintaining the temperature of the liquid L in the accommodation space S by isolating the most part of liquid L in the containing portion 2 from the outside. In addition, the flavor of the flavor portion 313 can be added to the liquid L in the accommodating space S, and the user can drink from the third opening 321 of the second part 32 to enjoy the temperature-appropriate liquid L with the flavor of the flavor portion 313 (neither too hot nor too cold).

Referring to FIGS. 1C to 1E again, in this embodiment, the flavor portion 313 can also be mixed with the edible starch of the first part 31 and then made into an artificial edible starch body. In other words, the flavor portion 313 can be mixed with the edible starch of the first part 31, and the flavor portion 313 and the edible starch of the first part 31 can together form an integrally formed single component (an edible starch body). When the liquid L enters the accommodating space S of the first part 31 from the first opening 3121 of the first part 31, the flavor portion 313 mixed in the first part 31 can be dissolved in the liquid L (while retaining the edible starch). Then, the user can drink the liquid L with the flavor of the flavor portion 313 from the third opening 321 of the second part 32. In particular, the edible starch ingredients such as, for example but not limited to, wheat flour (or flour), *quinoa* flour, potato starch, corn starch, sweet potato starch, glutinous rice flour, rice flour, cassava flour, lotus root flour or other edible starches well-known to skilled persons in the art.

Figure 2A:
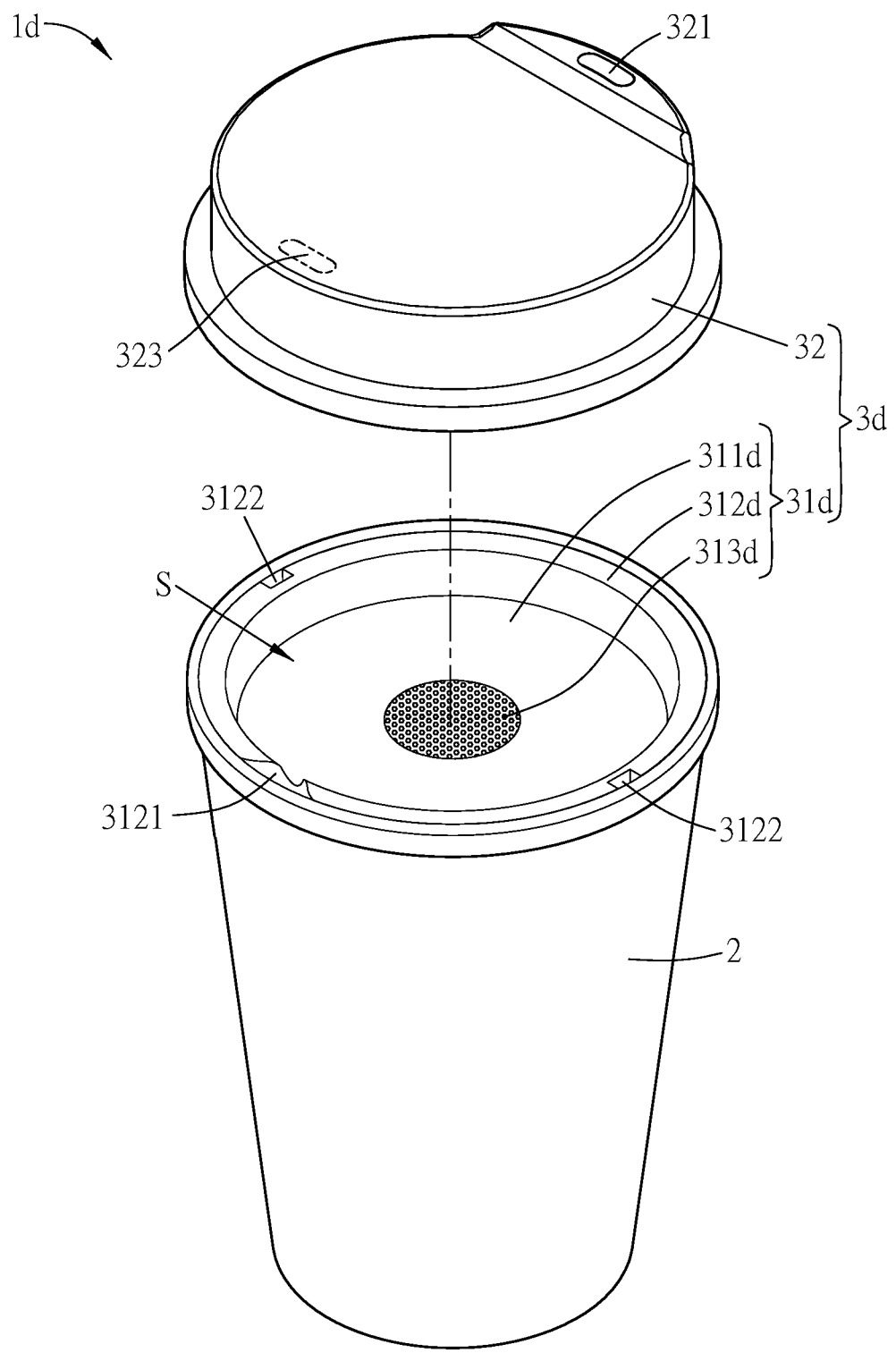
FIG. 2A is a schematic diagram showing a portable container according to a second embodiment of this disclosure, wherein the lid structure is applied to the containing portion.
Figure 2B:
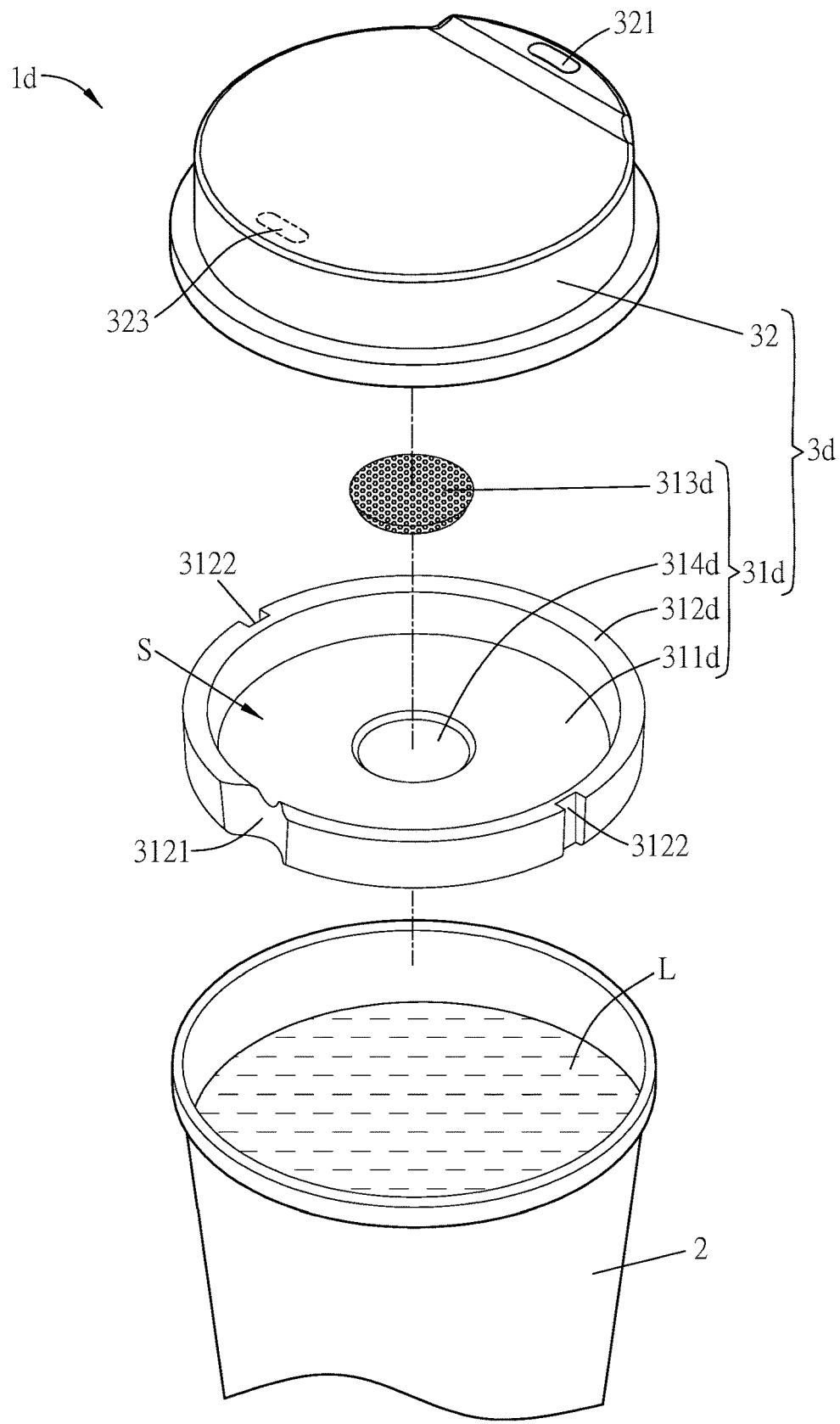
FIG. 2B is an exploded view of the lid structure and the containing portion of the portable container of FIG. 2A.
Figure 2C:
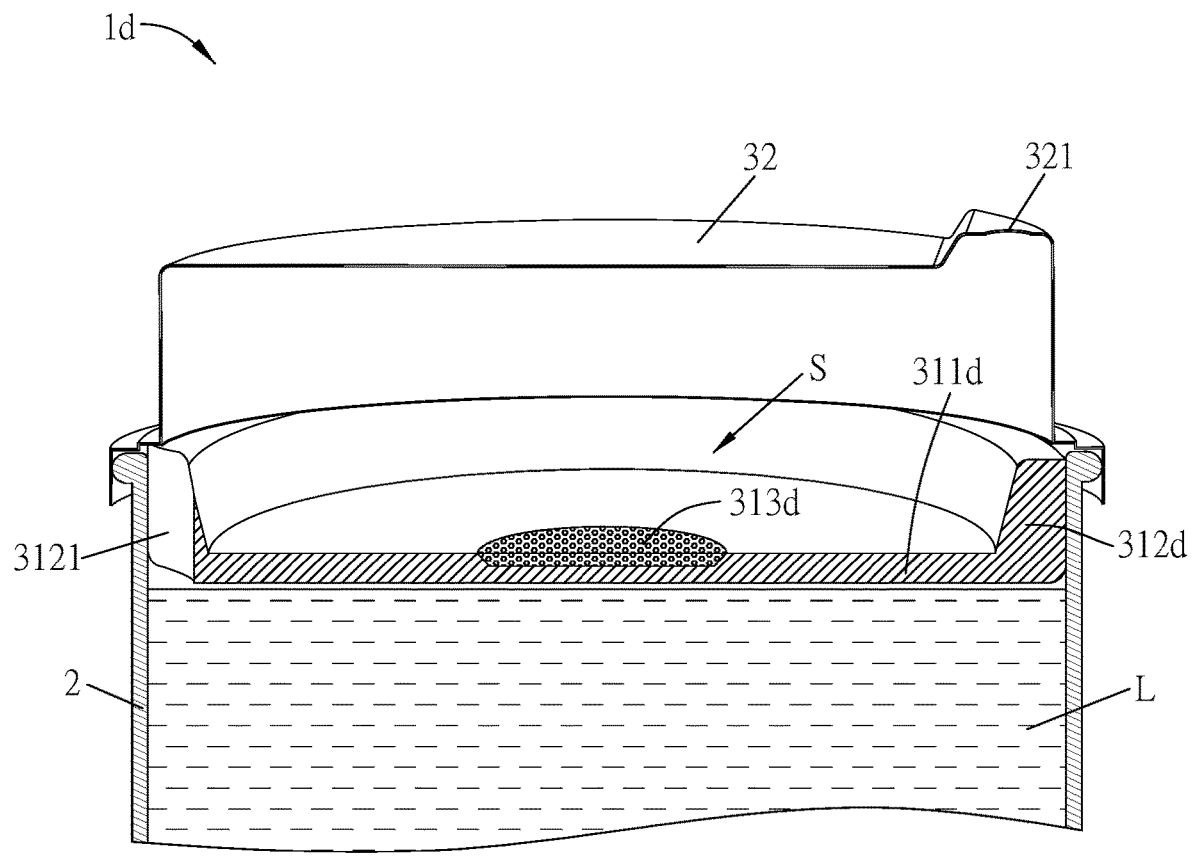
FIG. 2C is a sectional view of the assembled portable container of FIG. 2A.

Please refer to FIGS. 2A to 2C, wherein FIG. 2A is a schematic diagram showing a portable container according to a second embodiment of this disclosure, wherein the lid structure is applied to the containing portion, FIG. 2B is an exploded view of the lid structure and the containing portion of the portable container of FIG. 2A, and FIG. 2C is a sectional view of the assembled portable container of FIG. 2A. The structure, components and functions of the portable container 1*d* of the second embodiment are mostly the same as those of the above-mentioned portable container 1 of the first embodiment, so the detailed descriptions thereof will be omitted. The first embodiment and the second embodiment are different in the configuration of the first part of the lid structure. In the second embodiment, the first part 31*d* of the lid structure 3*d* further comprises at least one recess portion 314*d*. The at least one recess portion 314*d* is formed on the inner surface of the bottom portion 311*d* and/or the annular wall 312*d* facing the accommodating space S, and the at least one flavor portion 313*d* is disposed in the recess portion 314*d*. In particular, although the figures show that the first part 31*d* comprises one recess portion 314*d* and one flavor portion 313*d*, and the recess portion 314*d* is located at the center of the bottom portion 311*d*, however, the number of the recess portions 314*d*, the number of the flavor portions 313d and the positions thereof can be adjusted based on the requirement of user, and this disclosure is not limited thereto.

Figure 3A:
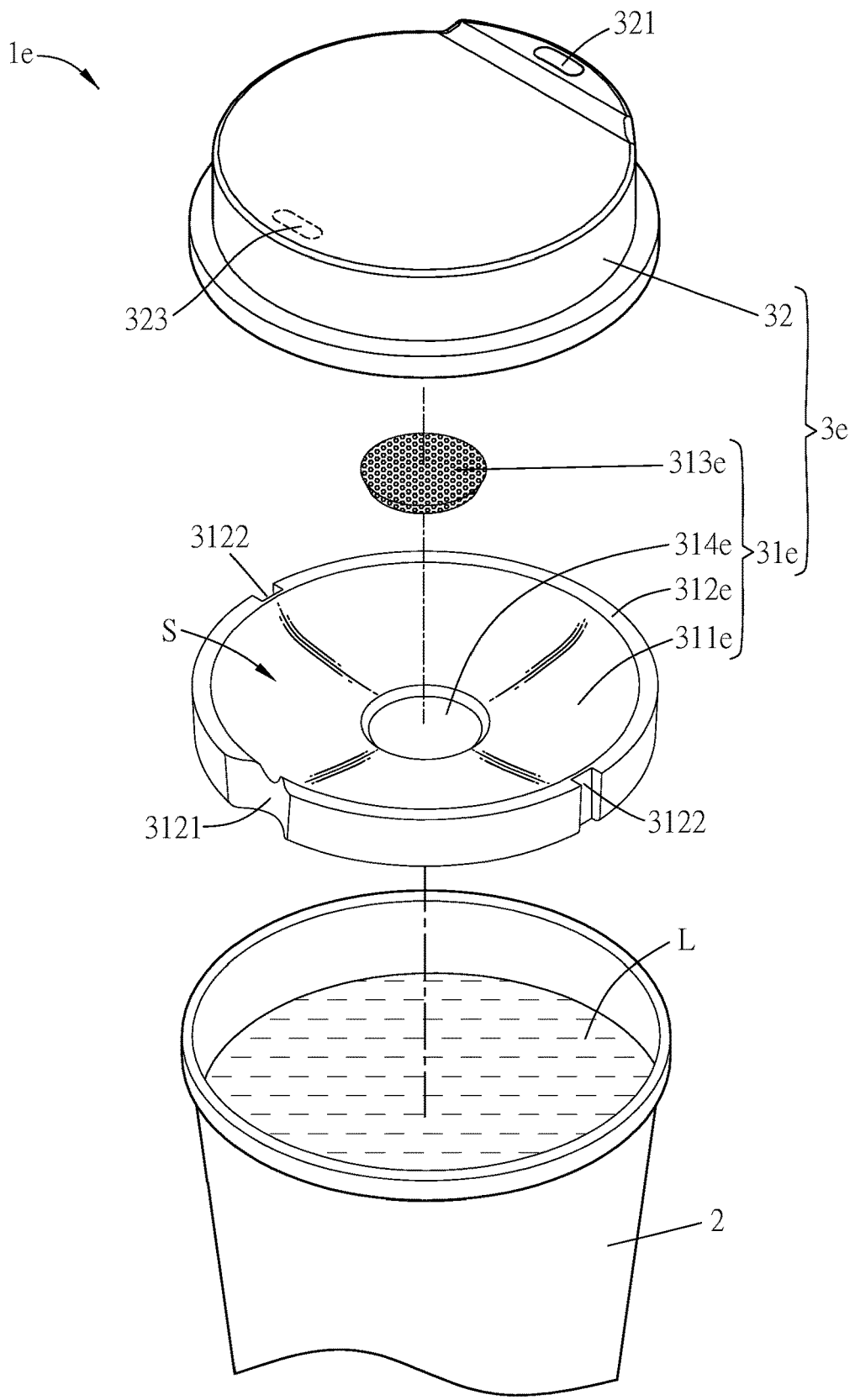
FIG. 3A is a schematic diagram showing a portable container according to a third embodiment of this disclosure, wherein the lid structure is applied to the containing portion.
Figure 3B:
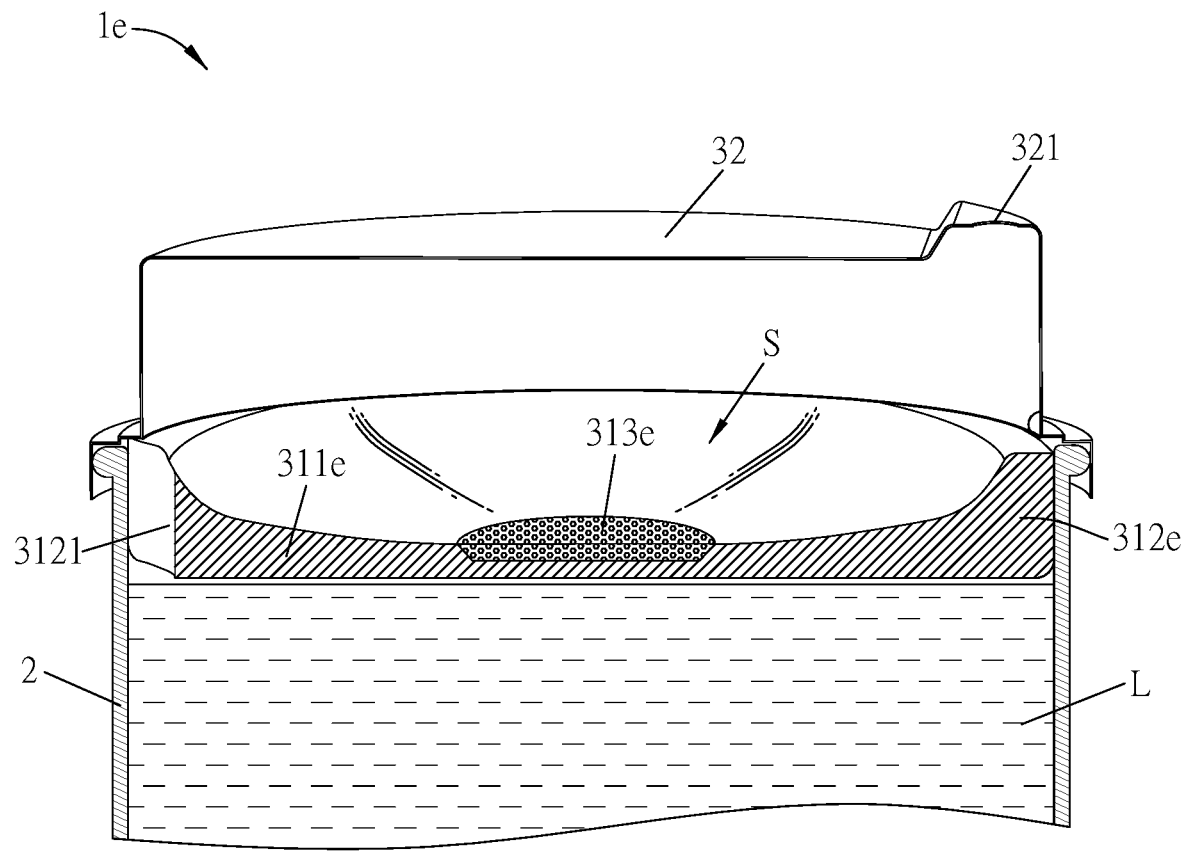
FIG. 3B is a sectional view of the assembled portable container of FIG. 3A.

Please refer to FIGS. 3A and 3B, wherein FIG. 3A is a schematic diagram showing a portable container according to a third embodiment of this disclosure, wherein the lid structure is applied to the containing portion, and FIG. 3B is a sectional view of the assembled portable container of FIG. 3A. The structure, components and functions of the portable container 1e of the third embodiment are mostly the same as those of the above-mentioned portable container 1d of the second embodiment, so the detailed descriptions thereof will be omitted. The third embodiment and the second embodiment are different in the configuration of the bottom portion of the first part of the lid structure. As shown in FIGS. 2A and 2C, the bottom portion 311d of the first part 31d of the lid structure 3d of the second embodiment has a uniform thickness. As shown in FIGS. 3A and 3B, the bottom portion 311e of the first part 31e of the lid structure 3e of the third embodiment has a non-uniform thickness. The sectional view of the inner surface of the bottom portion 311e has an arc-shape, and the thickness of the bottom portion 311e is gradually thinner as getting closer to the recess portion 314e. This design can collect the liquid L, which enters into the accommodating space S, at the center of the bottom portion 311e (i.e., the recess portion 314e). In particular, although the figures show that the first part 31e comprises one recess portion 314e and one flavor portion 313e, and the recess portion 314e is located at the center of the bottom portion 311e, however, the number of the recess portions 314e, the number of the flavor portions 313e, the positions thereof, and the thickness of the bottom portion 311e can be adjusted based on the requirement of user, and this disclosure is not limited thereto.

Figure 4A:
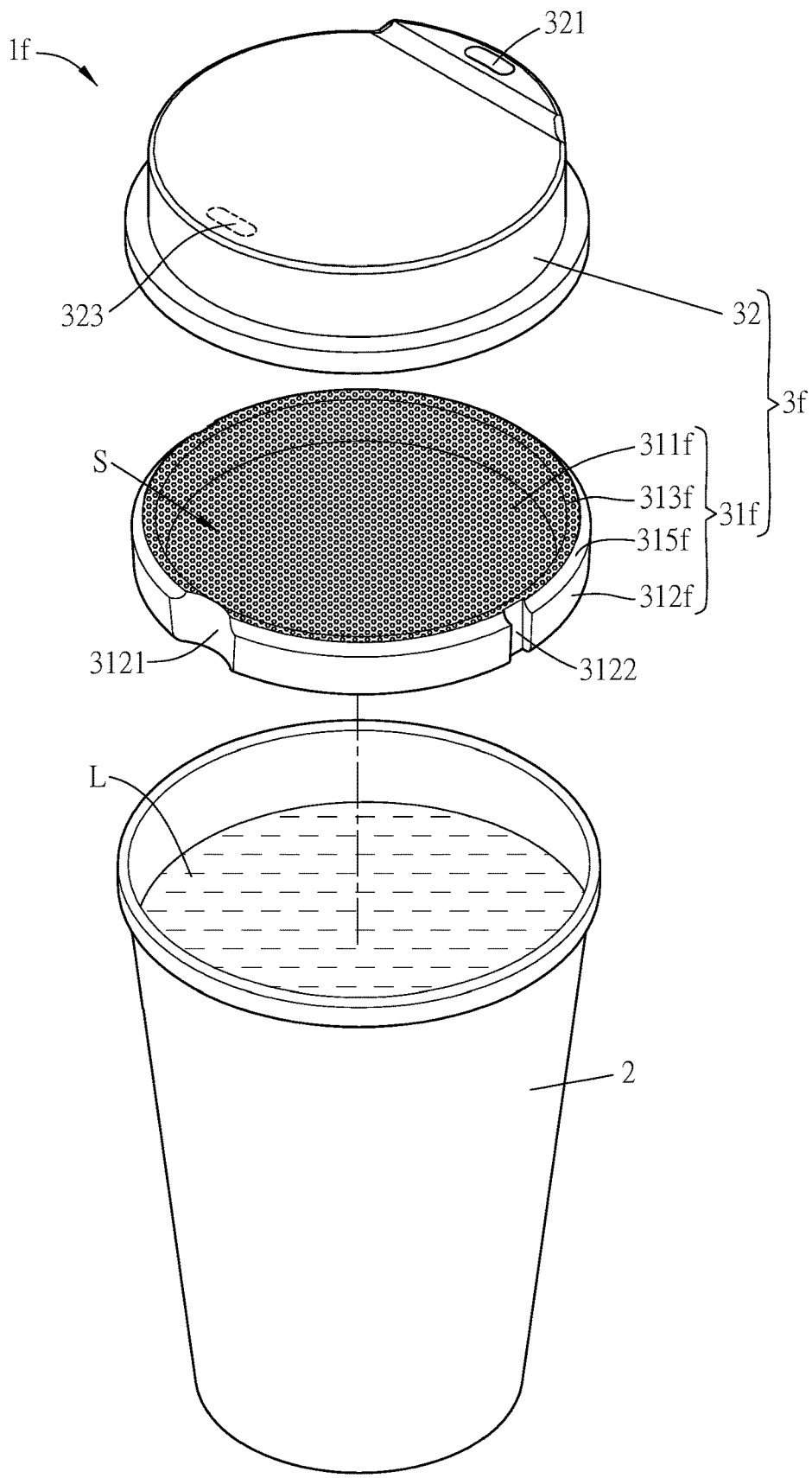
FIG. 4A is a schematic diagram showing a portable container according to a fourth embodiment of this disclosure, wherein the lid structure is applied to the containing portion.
Figure 4B:
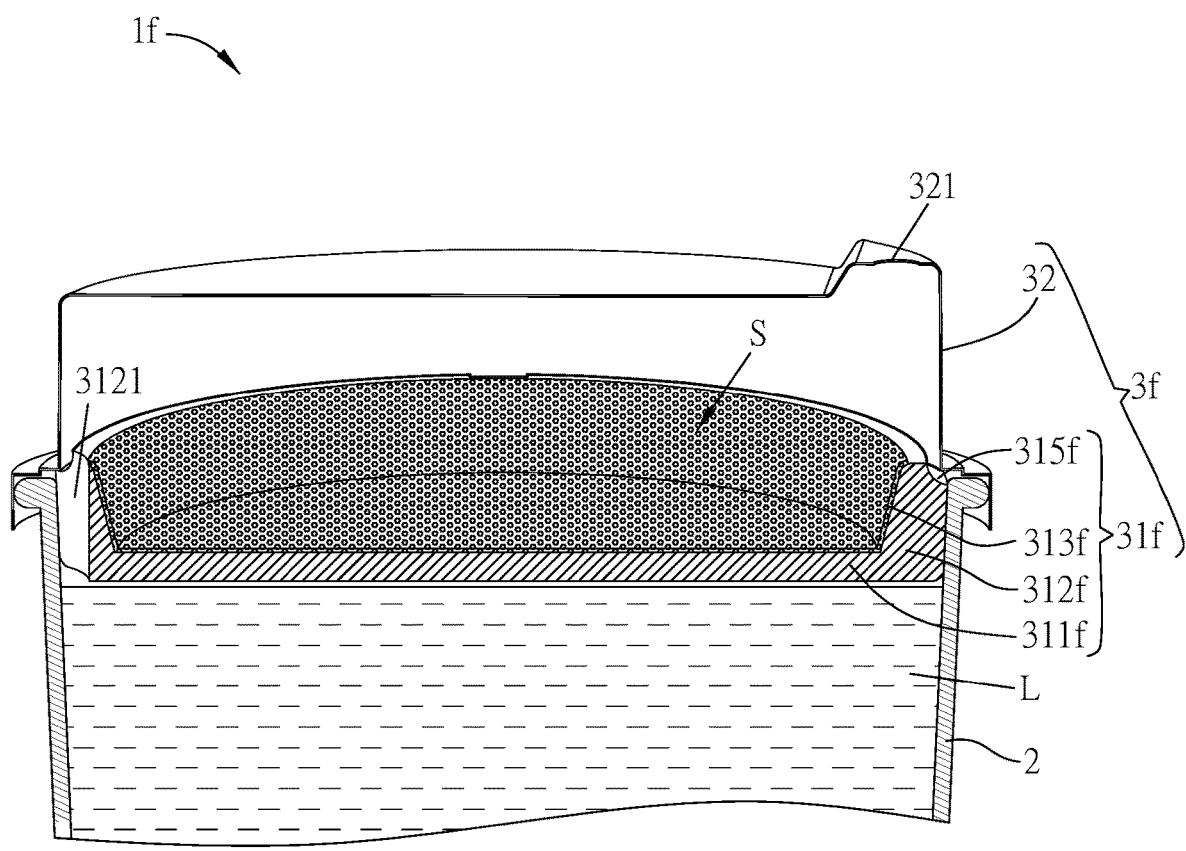
FIG. 4B is a sectional view of the assembled portable container of FIG. 4A.

Please refer to FIGS. 4A and 4B, wherein FIG. 4A is a schematic diagram showing a portable container according to a fourth embodiment of this disclosure, wherein the lid structure is applied to the containing portion, and FIG. 4B is a sectional view of the assembled portable container of FIG. 4A. The structure, components and functions of the portable container 1f of the fourth embodiment are mostly the same as those of the above-mentioned portable container 1 of the first embodiment, so the detailed descriptions thereof will be omitted. The first embodiment and the fourth embodiment are different in the configuration of the first part of the lid structure. In this embodiment, the first part 31f of the lid structure 3f further comprises a groove 315f configured on at least a part of the outer periphery of the annular wall 312f away from the accommodating space S and the bottom portion 311f. Specifically, as shown in FIG. 4B, based on this design of the groove 315f, which is configured on at least a part of the outer periphery of the annular wall 312f away from the accommodating space S and the bottom portion 311f, when the first part 31f covers an inner periphery of the containing portion 2 close to a rim of the containing portion 2, it can be closer to the rim (the groove 315f of the first part 31f is higher than the rim). Accordingly, when the second part 32 covers an outer periphery of the rim, it will not be interfered by the first part 31f, which is disposed higher than the rim, and may fail to cap the containing portion 2. Based on this design, the internal space of the containing portion 2 occupied by the first part 31f can be decreased, so that the capacity of the containing portion 2 for containing the liquid can be increased.

Figure 4C:
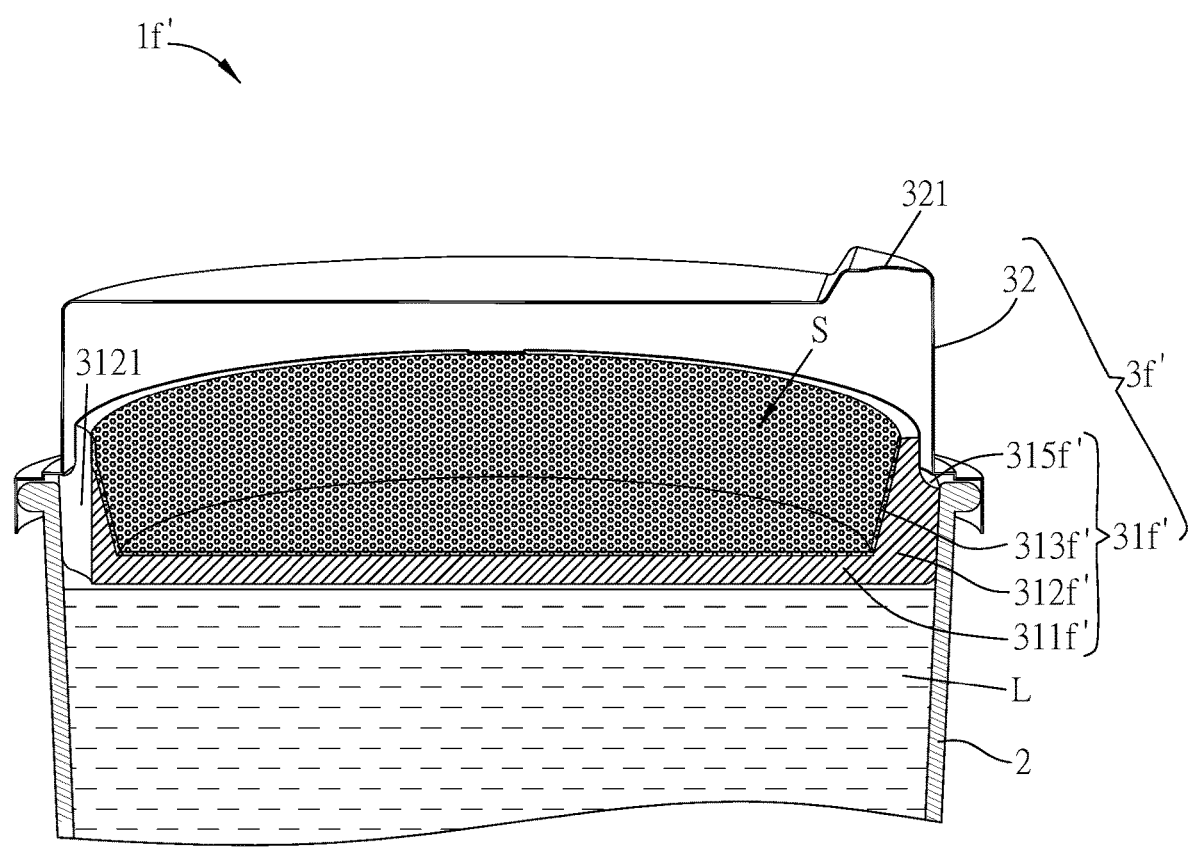
FIG. 4C is a sectional view showing another aspect of the portable container of FIG. 4A.

Please refer to FIG. 4C in view of FIG. 4B, wherein FIG. 4C is a sectional view showing another aspect of the portable container of FIG. 4A. The structure, components and functions of the portable container 1f' are mostly the same as those of the above-mentioned portable container 1f, so the detailed descriptions thereof will be omitted. The portable container 1f' and the portable container 1f are different in the heights of the annular wall 312f' and the groove 315f' of the first part of the lid structure. In this embodiment, the first part 31f' of the lid structure 3f' further comprises a groove 315f' configured on at least a part of the outer periphery of the annular wall 312f' away from the accommodating space S and the bottom portion 311f'. Specifically, as shown in FIG. 4C, based on this design of the groove 315f', which is configured on at least a part of the outer periphery of the annular wall 312f' away from the accommodating space S and the bottom portion 311f', when the first part 31f' covers an inner periphery of the containing portion 2 close to a rim of the containing portion 2, it can be closer to the rim (the groove 315f' of the first part 31f' is higher than the rim). Accordingly, when the second part 32 covers an outer periphery of the rim, it will not be interfered by the first part 31f', which is disposed higher than the rim, and may fail to cap the containing portion 2. In addition, the higher annular wall 312f' can increase the capacity of the accommodating space S for accommodating the liquid L, so that it is possible to adjust the flavor and temperature of a larger amount of liquid L, thereby increasing the convenience of drinking.

Figure 5A:
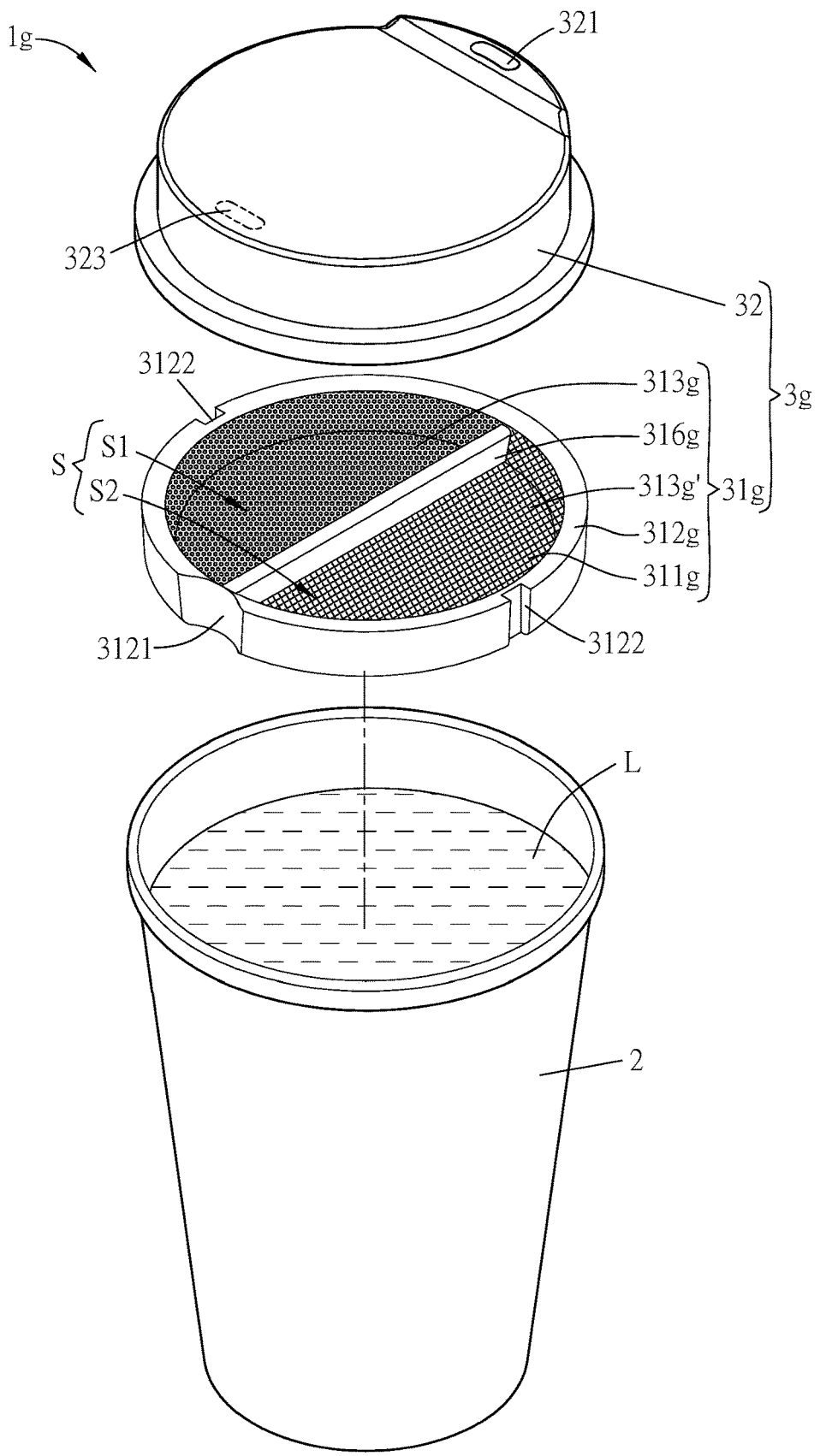
FIG. 5A is a schematic diagram showing a portable container according to a fifth embodiment of this disclosure, wherein the lid structure is applied to the containing portion.
Figure 5B:
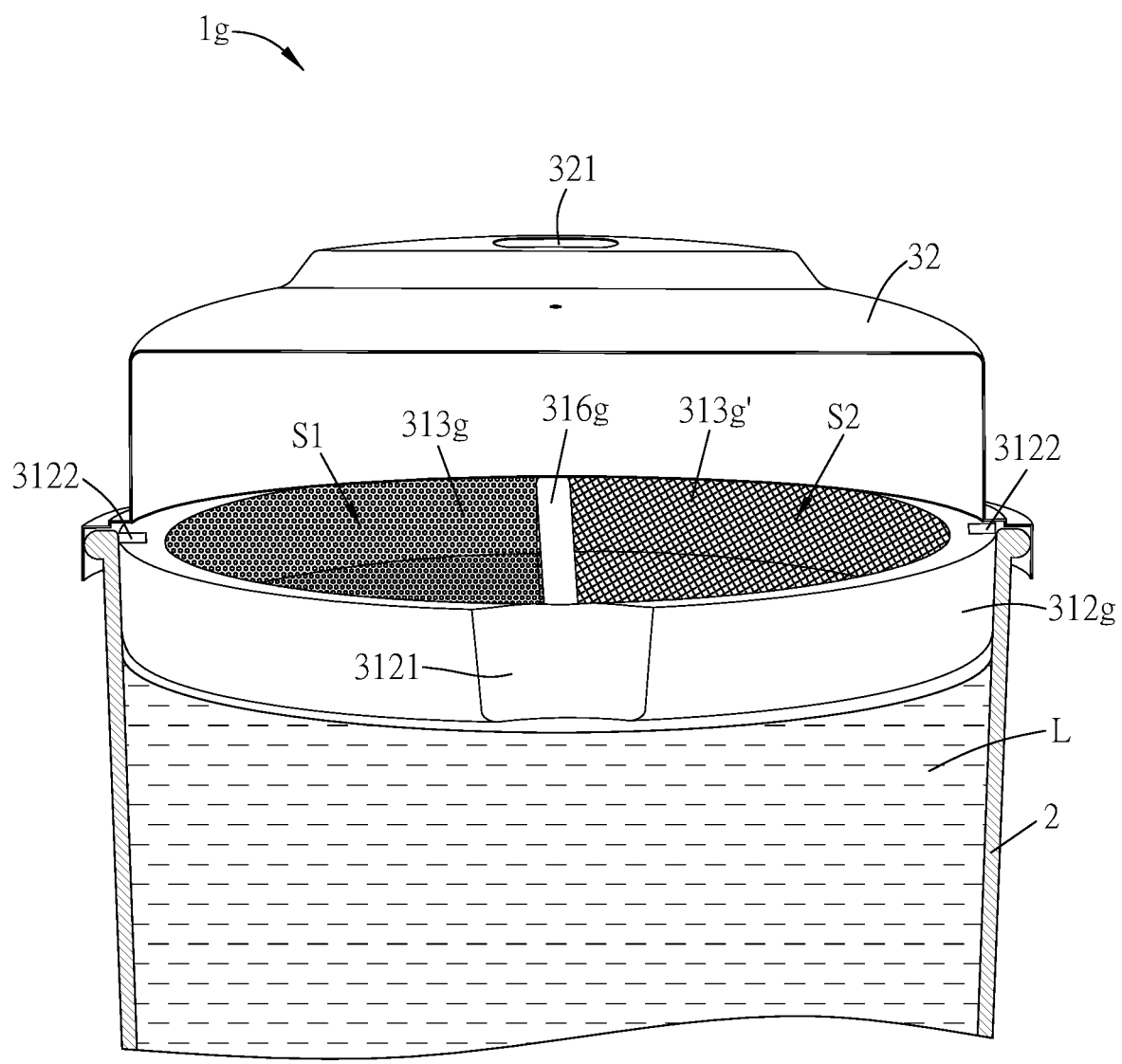
FIG. 5B is a perspective schematic view of the assembled portable container of FIG. 5A.

Please refer to FIGS. 5A to 5B, wherein FIG. 5A is a schematic diagram showing a portable container according to a fifth embodiment of this disclosure, wherein the lid structure is applied to the containing portion, and FIG. 5B is a perspective schematic view of the assembled portable container of FIG. 5A. The structure, components and functions of the portable container 1g of the fifth embodiment are mostly the same as those of the above-mentioned portable container 1 of the first embodiment, so the detailed descriptions thereof will be omitted. The first embodiment and the fifth embodiment are different in the configuration of the first part of the lid structure. In this embodiment, the first part 31g of the lid structure 3g further comprises a partition portion 316g. The partition portion 316g is configured on the inner surface of the bottom portion 311g facing the accommodating space S, and two ends of the partition portion 316g connect to the annular wall 312g for separating the accommodating space S into a first accommodating space S1 and a second accommodating space S2. In this embodiment, the first part 1g comprises at least two flavor portions 313g and 313g', and the at least two flavor portions 313g and 313g' are arranged in the first accommodating space S1 and the second accommodating space S2, respectively. In this embodiment, the outer periphery of the annular wall 312g is configured with a first opening 3121, and the first opening 3121 is arranged corresponding to the partition portion 316g. As shown in the figure, the first opening 3121 is arranged corresponding to one end of the partition portion 316g and also corresponding to both of the first accommodating space S1 and the second accommodating space S2.

Figure 5C:
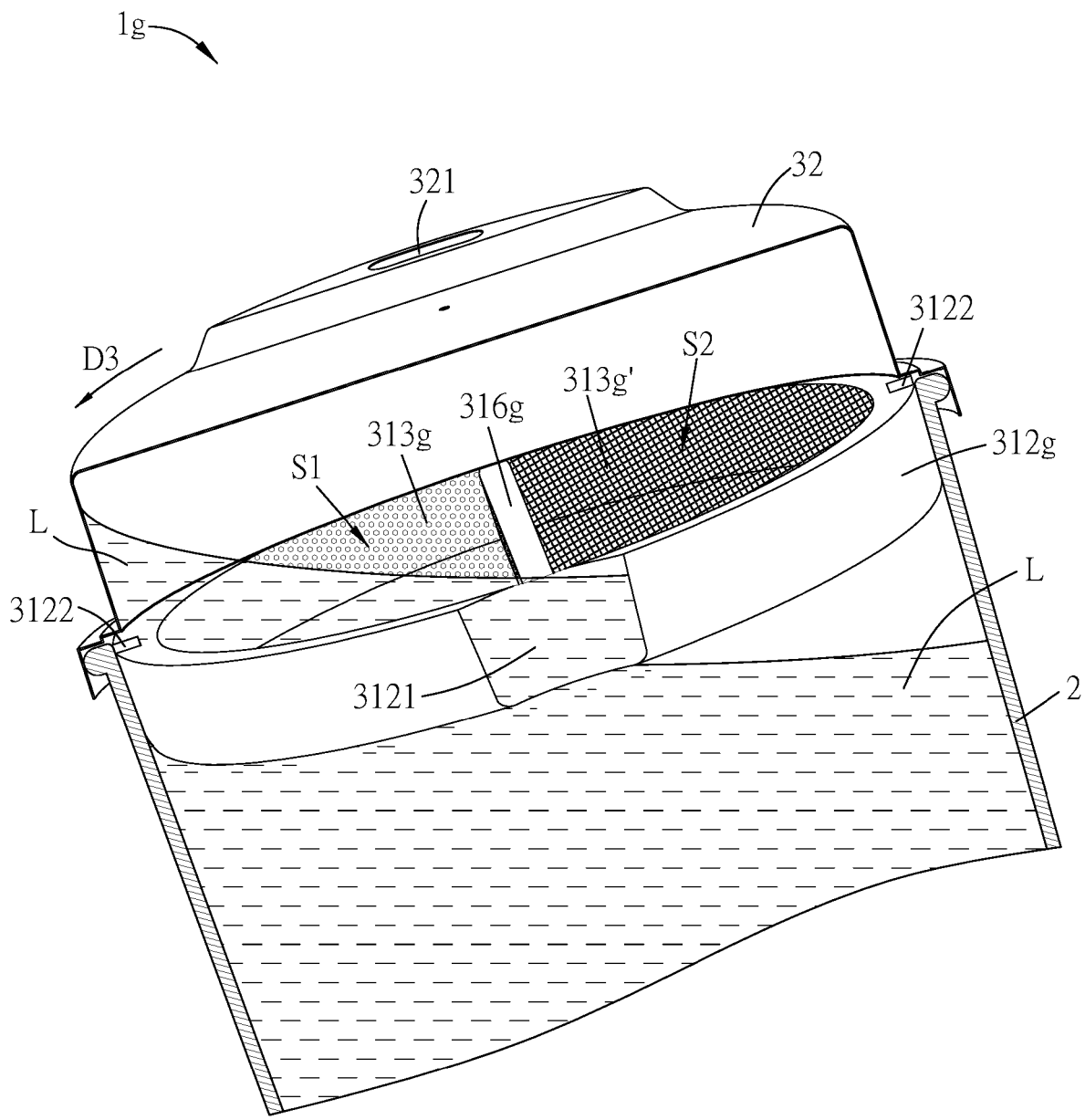
FIG. 5C to FIG. 5D are schematic diagram showing the continuous operations in drinking status of the portable container of FIG. 5B.
Figure 5D:
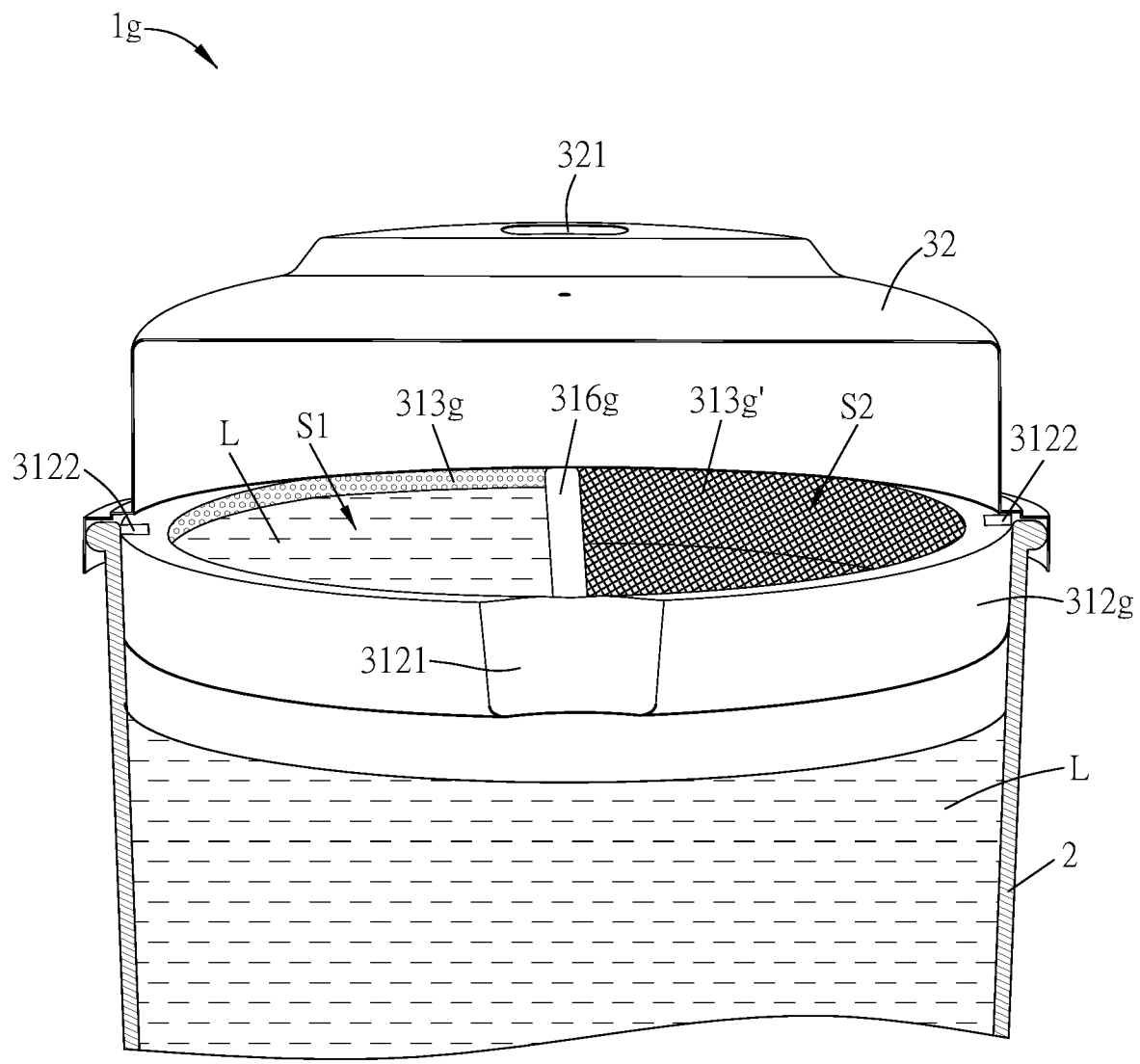
Figure 5E:
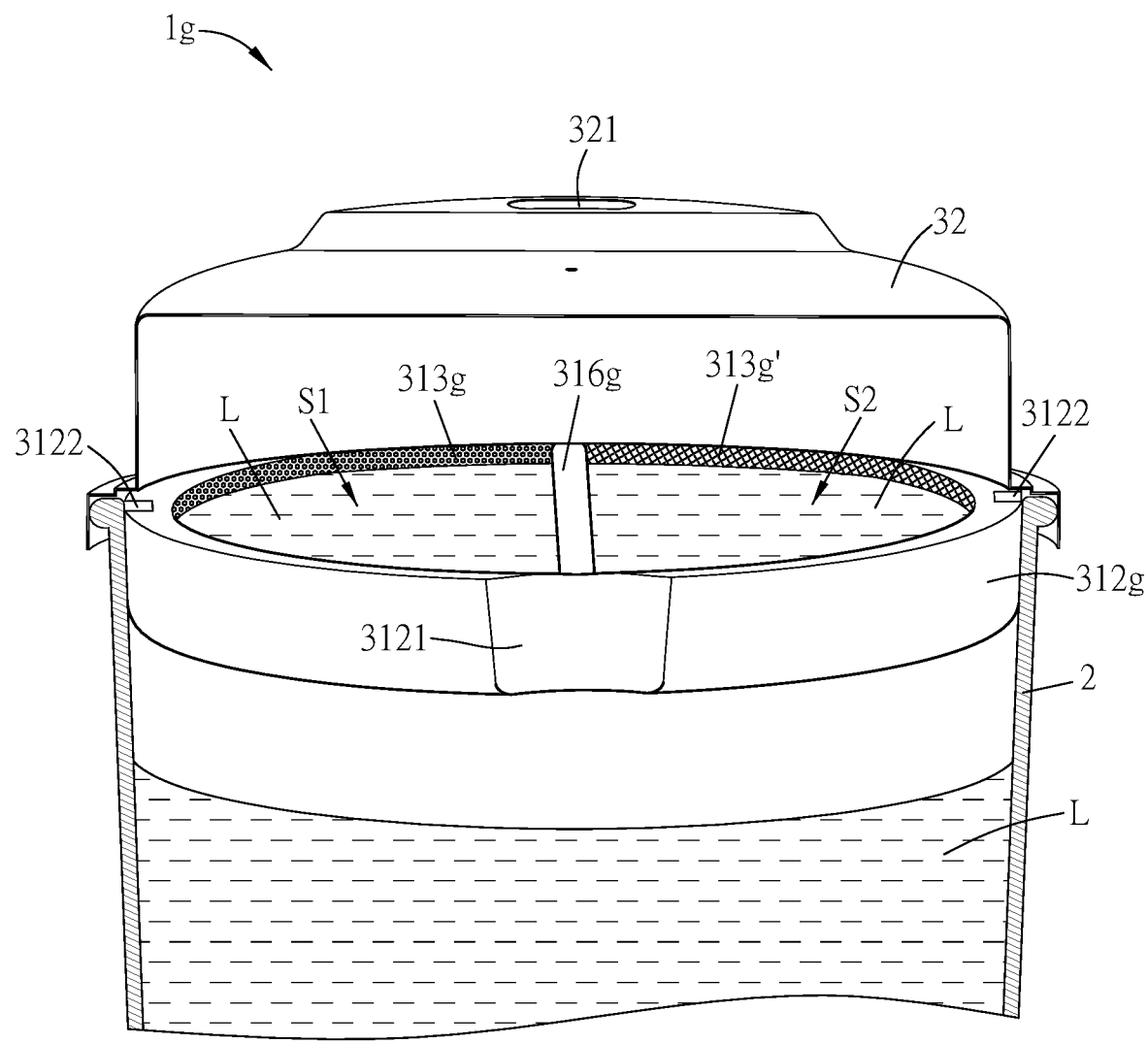
FIG. 5E is a schematic diagram showing another drinking status of the portable container of FIG. 5B.

The operations of utilizing the flavor portion to increase the flavor of the contained liquid in the portable container will be described hereinafter with reference to FIGS. 5C to 5E. FIG. 5C to FIG. 5D are schematic diagram showing the continuous operations in drinking status of the portable container of FIG. 5B, and FIG. 5E is a schematic diagram showing another drinking status of the portable container of FIG. 5B. For example, when the user wants to add the flavor of the flavor portion 313g to the liquid L in the container, the portable container 1g should first be tilted toward the first opening 3121 and the first accommodating space S1 (see the arrow direction D3 of FIG. 5C) for a few seconds to allow the liquid L to flow into the first accommodating space S1 (as shown in FIG. 5C). Then, the portable container can be returned to the stand-up position. At this time, the excess liquid L will flow from the second openings 3122 back to the inside of the container portion 2. Since the flavor portion 313g is edible and soluble, after the liquid L flows into the first accommodating space S1 (as shown in FIG. 5D), it will contact the flavor portion 313g, so that the flavor portion 313g can be dissolved in the liquid L. Accordingly, the liquid L will be added with the flavor of the flavor portion 313g. After that, the portable container 1g is directly tilted toward the third opening 321, and the user can drink the liquid L added with the flavor of the flavor portion 313g. Similarly, when the user wants to add the flavor of the flavor portion 313g' to the liquid L in the container, the portable container 1g should first be tilted toward the first opening 3121 and the second accommodating space S2 (not shown) for a few seconds to allow the liquid L to flow into the second accommodating space S2. Then, the portable container can be returned to the stand-up position. At this time, the excess liquid L will flow from the second openings 3122 back to the inside of the container portion 2. Since the flavor portion 313g' is edible and soluble, after the liquid L flows into the second accommodating space S2, it will contact the flavor portion 313g', so that the flavor portion 313g' can be dissolved in the liquid L. Accordingly, the liquid L will be added with the flavor of the flavor portion 313g'. After that, the portable container 1g is directly tilted toward the third opening 321, and the user can drink the liquid L added with the flavor of the flavor portion 313g'. In addition, when the user wants to add both of the flavors of the flavor portions 313g and 313g' to the liquid L in the container, the portable container 1g should first be tilted toward the first opening 3121 (not shown) for a few seconds to allow the liquid L to flow into the first accommodating space S1 and the second accommodating space S2. Then, the portable container can be returned to the stand-up position (As shown in FIG. 5E). At this time, the excess liquid L will flow from the second openings 3122 back to the inside of the container portion 2. Since the flavor portions 313g and 313g' are edible and soluble, after the liquid L flows into the first accommodating space S1 and the second accommodating space S2, it will contact the flavor portions 313g and 313g', so that the flavor portions 313g and 313g' can be dissolved in the liquid L. Accordingly, the liquid L will be added with both flavors of the flavor portions 313g and 313g'. After that, the portable container 1g is directly tilted toward the third opening 321, and the user can drink the liquid L added with the flavors of the flavor portions 313g and 313g'. For example, as shown in FIG. 5B, the liquid L is hot coffee, the flavor portion 313g is chocolate, and the flavor portion 313g' is milk, wherein the chocolate and milk can be arranged on the inner surface of the bottom portion 311g and the annular wall 312g facing the first accommodating space S1 and the second accommodating space S2 by spraying, coating, printing, screen printing, placing, embedding, or sticking. The user can proceed the continuous operations with the portable container in drinking status so as to make the hot coffee enter the first accommodating space S1 and/or the second accommodating space S2 of the first part 31g from the first opening 3121 so as the dissolve the chocolate and/or milk into the hot coffee. Accordingly, the hot coffee with a chocolate and/or milk flavor (chocolate coffee, latte or chocolate latte, also known as mocha flavored coffee) can be provided from the third opening 321 of the second part 32.

Figure 6A:
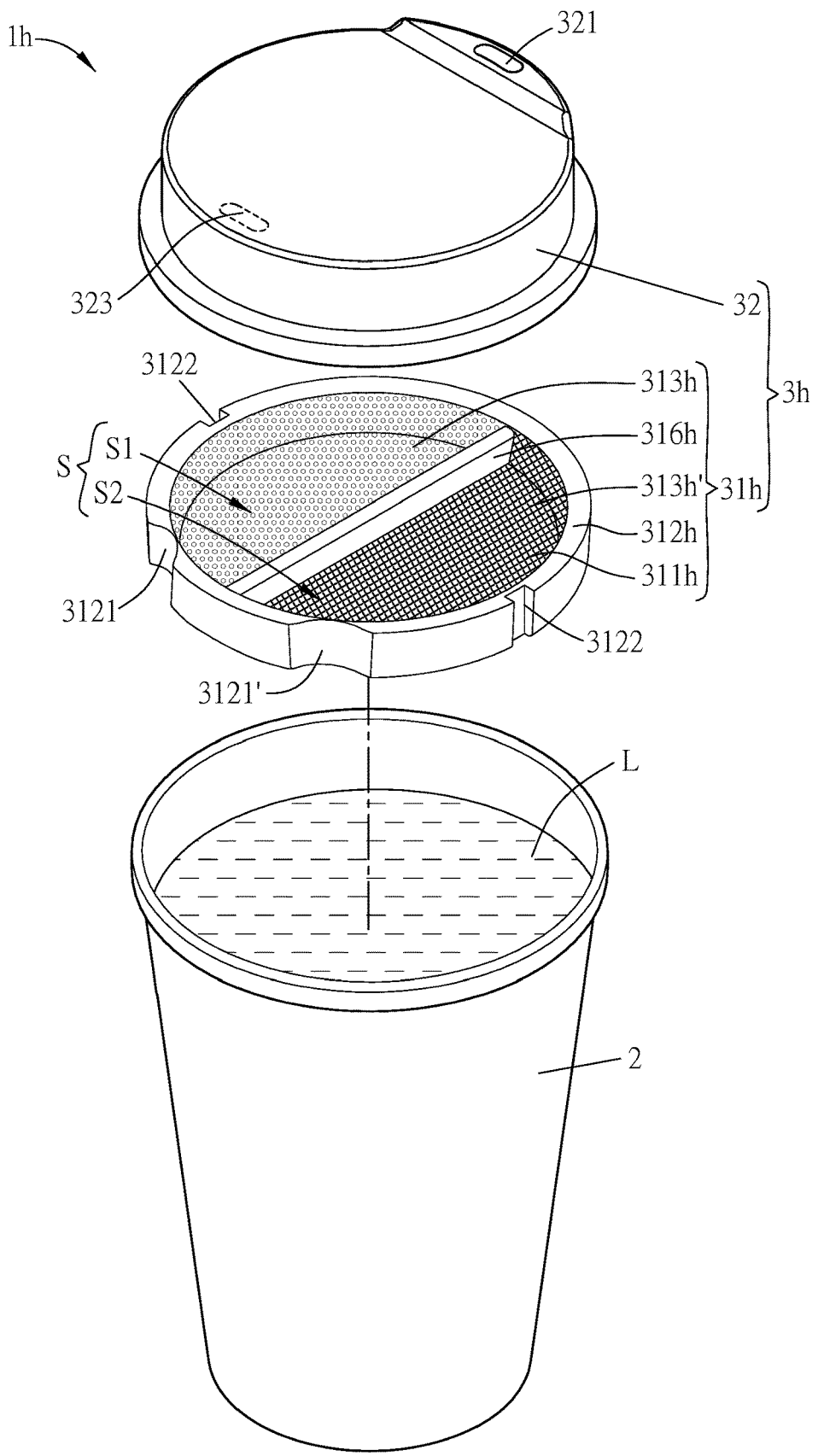
FIG. 6A is a schematic diagram showing a portable container according to a sixth embodiment of this disclosure, wherein the lid structure is applied to the containing portion.
Figure 6B:
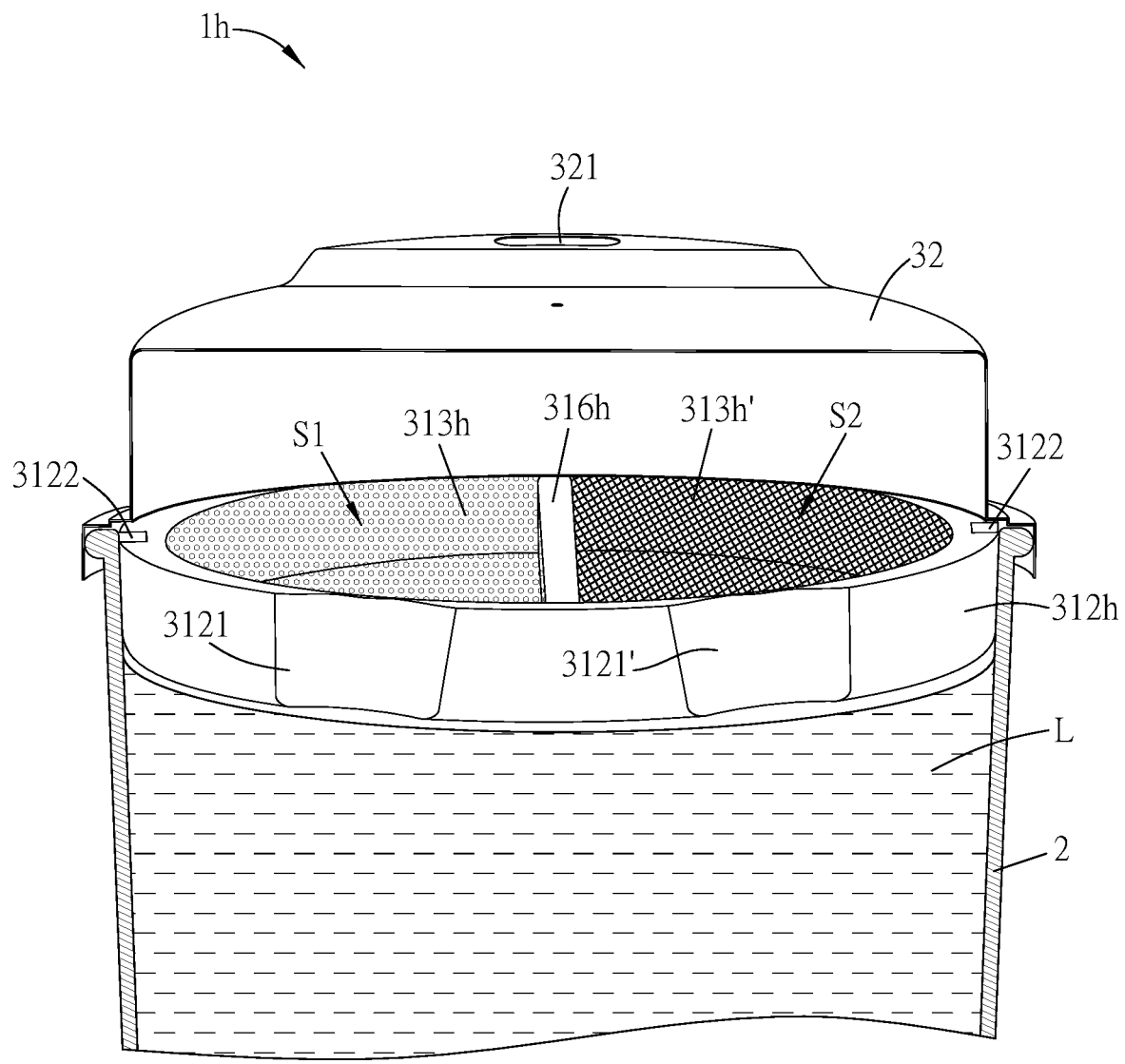
FIG. 6B is a perspective schematic view of the assembled portable container of FIG. 6A.

Please refer to FIGS. 6A to 6B, wherein FIG. 6A is a schematic diagram showing a portable container according to a sixth embodiment of this disclosure, wherein the lid structure is applied to the containing portion, and FIG. 6B is a perspective schematic view of the assembled portable container of FIG. 6A. The structure, components and functions of the portable container 1h of the sixth embodiment are mostly the same as those of the above-mentioned portable container 1g of the fifth embodiment, so the detailed descriptions thereof will be omitted. The sixth embodiment and the fifth embodiment are different in the configuration of the first opening of the first part of the lid structure. In this embodiment, the outer periphery of the annular wall 312h comprises two first openings 3121 and 3121', which are arranged corresponding the first accommodating space S1 and the second accommodating space S2, respectively. Each of the first openings 3121 and 3121' is disposed close to one end of the partition portion 316h.

Figure 6C:
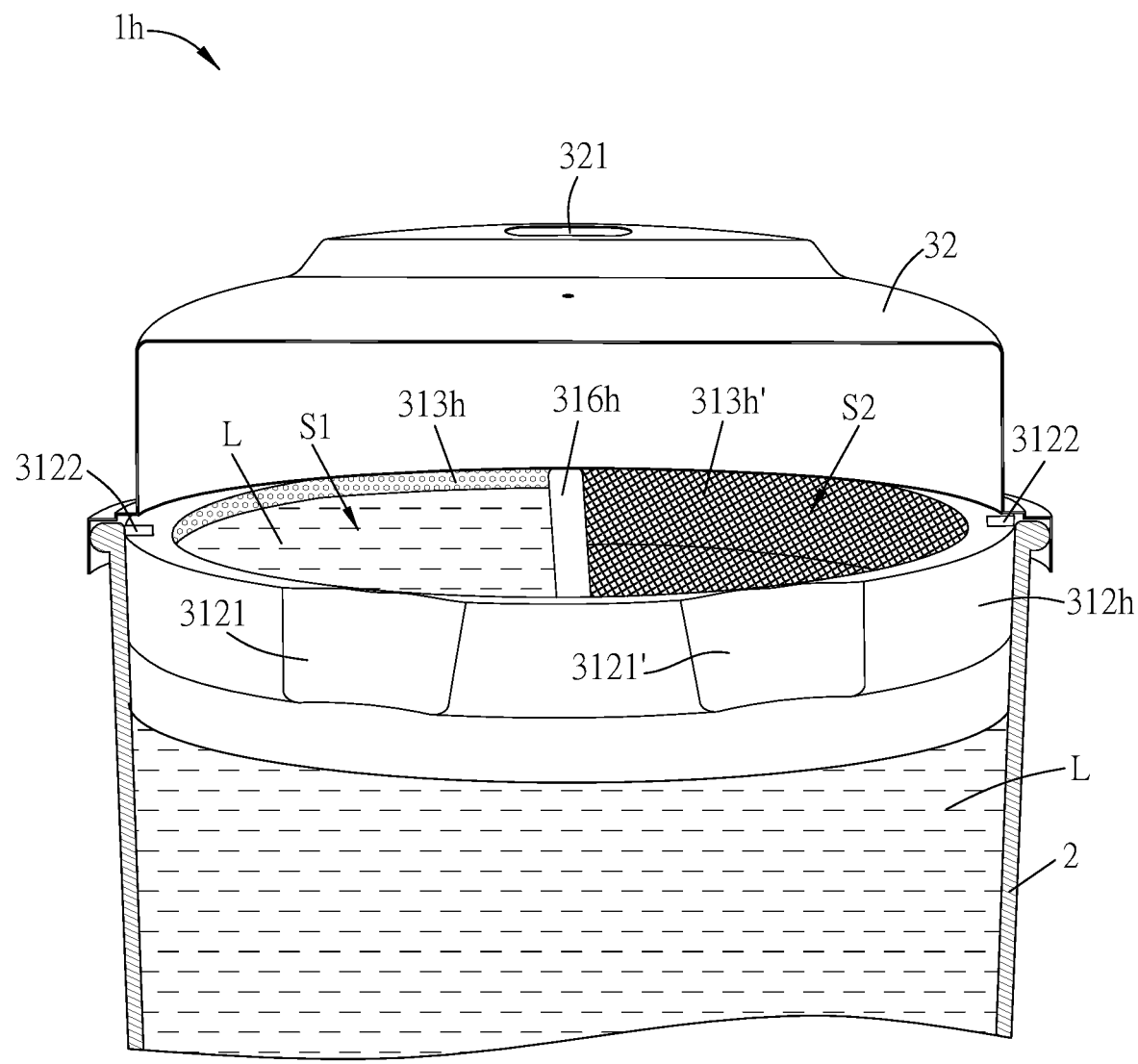
FIG. 6C to FIG. 6D are schematic diagram showing different drinking statuses of the portable container of FIG. 6B.
Figure 6D:
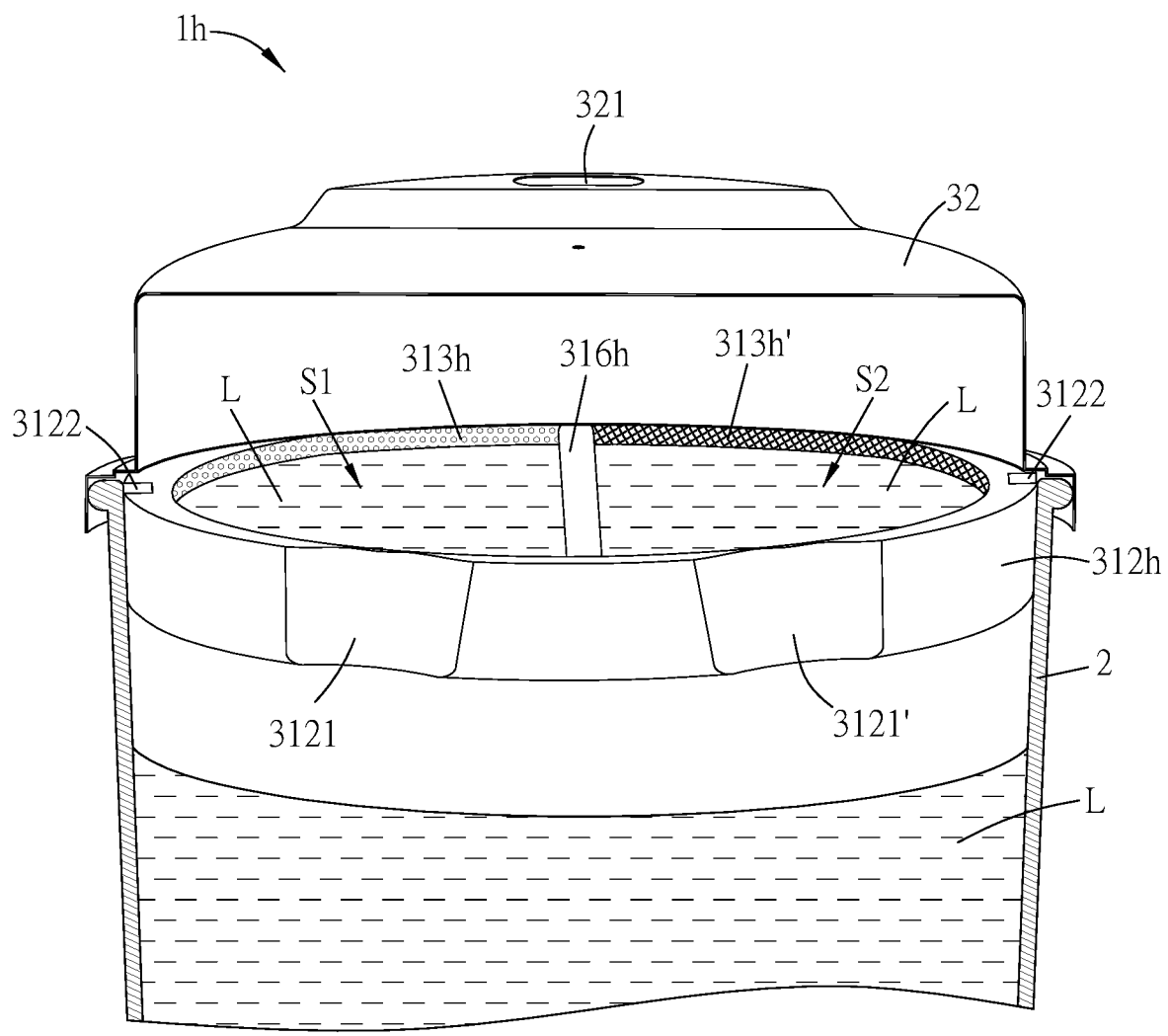

Please refer to FIGS. 6C to 6D, wherein FIG. 6C to FIG. 6D are schematic diagram showing different drinking statuses of the portable container of FIG. 6B. For example, when the user wants to add the flavor of the flavor portion 313h to the liquid L in the container, the portable container 1h should first be tilted toward the first opening 3121 and the first accommodating space S1 for a few seconds to allow the liquid L to flow into the first accommodating space S1 (as shown in FIG. 6C). Then, the portable container can be returned to the stand-up position. At this time, the excess liquid L will flow from the second openings 3122 back to the inside of the container portion 2. Since the flavor portion 313h is edible and soluble, after the liquid L flows into the first accommodating space S1 (as shown in FIG. 6C), it will contact the flavor portion 313h, so that the flavor portion 313h can be dissolved in the liquid L. Accordingly, the liquid L will be added with the flavor of the flavor portion 313h. After that, the portable container 1h is directly tilted toward the third opening 321, and the user can drink the liquid L added with the flavor of the flavor portion 313h. Similarly, when the user wants to add the flavor of the flavor portion 313h' to the liquid L in the container, the portable container 1h should first be tilted toward the first opening 3121' and the second accommodating space S2 (not shown) for a few seconds to allow the liquid L to flow into the second accommodating space S2. Then, the portable container can be returned to the stand-up position. At this time, the excess liquid L will flow from the second openings 3122 back to the inside of the container portion 2. Since the flavor portion 313h' is edible and soluble, after the liquid L flows into the second accommodating space S2, it will contact the flavor portion 313h', so that the flavor portion 313h' can be dissolved in the liquid L. Accordingly, the liquid L will be added with the flavor of the flavor portion 313h'. After that, the portable container 1h is directly tilted toward the third opening 321, and the user can drink the liquid L added with the flavor of the flavor portion 313h'. In addition, when the user wants to add both of the flavors of the flavor portions 313h and 313h' to the liquid L in the container, the portable container 1h should first be tilted toward the first openings 3121 and 3121' (not shown) for a few seconds to allow the liquid L to flow into the first accommodating space S1 and the second accommodating space S2. Then, the portable container can be returned to the stand-up position (As shown in FIG. 6D). At this time, the excess liquid L will flow from the second openings 3122 back to the inside of the container portion 2. Since the flavor portions 313h and 313h' are edible and soluble, after the liquid L flows into the first accommodating space S1 and the second accommodating space S2, it will contact the flavor portions 313h and 313h', so that the flavor portions 313h and 313h' can be dissolved in the liquid L. Accordingly, the liquid L will be added with both flavors of the flavor portions 313$h$ and 313$h'$. After that, the portable container 1$h$ is directly tilted toward the third opening 321, and the user can drink the liquid L added with the flavors of the flavor portions 313$h$ and 313$h'$. Compared to the fifth embodiment, this embodiment has a design of two first openings 3121 and 3121', so that it is easier to control the liquid to flow into the first accommodating space S1 only or into the second accommodating space S2 only.

Figure 7A:
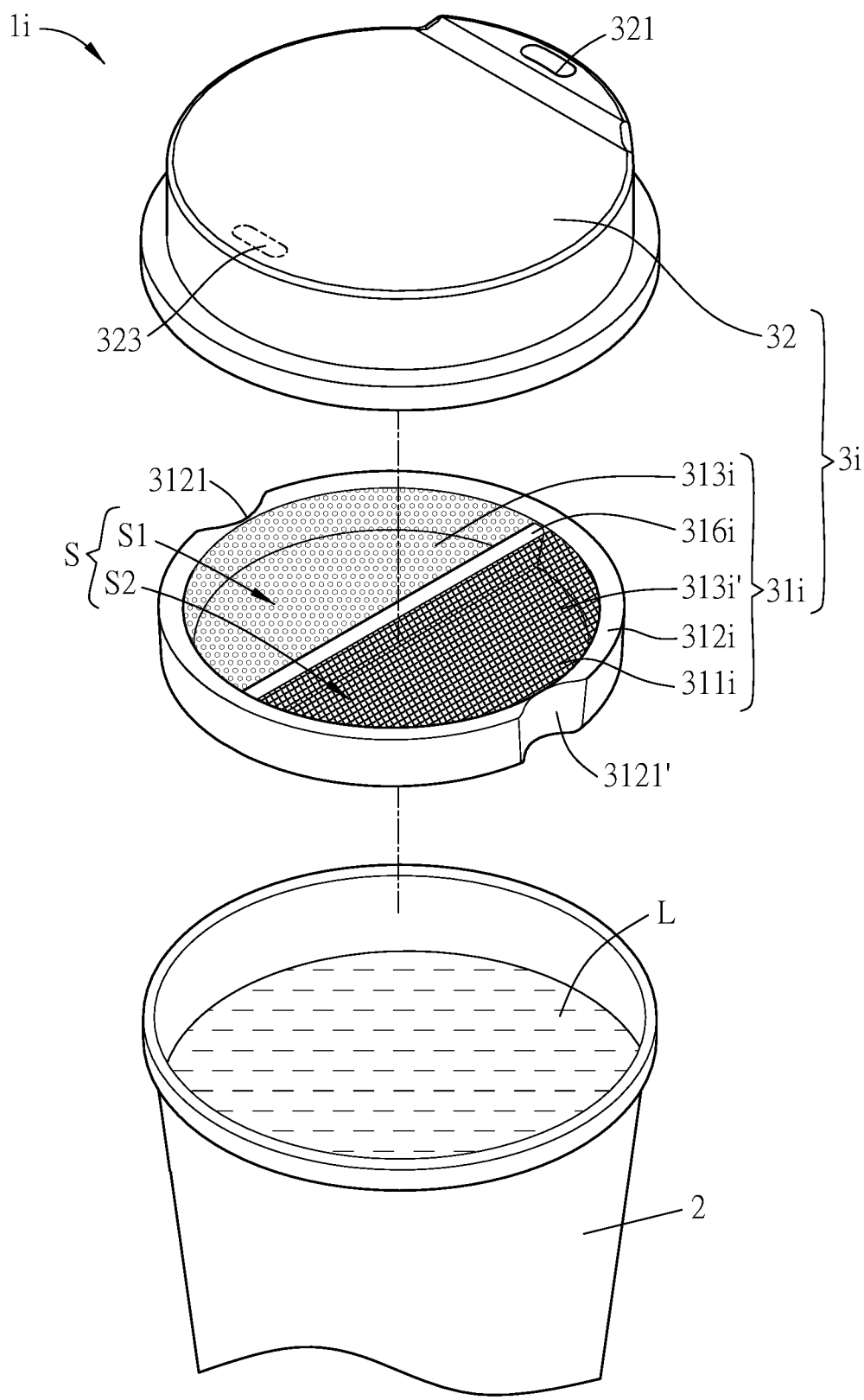
FIG. 7A is a schematic diagram showing a portable container according to a seventh embodiment of this disclosure, wherein the lid structure is applied to the containing portion.
Figure 7B:
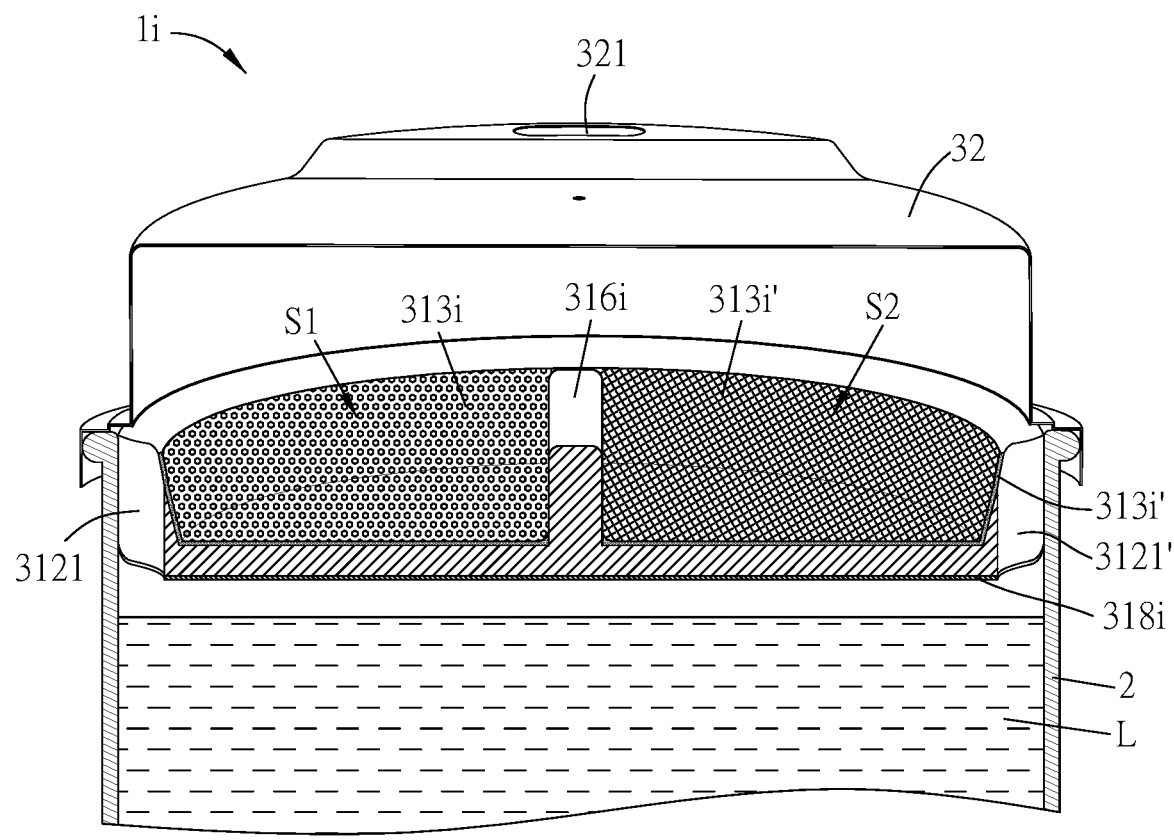
FIG. 7B is a sectional view of the assembled portable container of FIG. 7A.

Please refer to FIGS. 7A to 7B, wherein FIG. 7A is a schematic diagram showing a portable container according to a seventh embodiment of this disclosure, wherein the lid structure is applied to the containing portion, and FIG. 7B is a sectional view of the assembled portable container of FIG. 7A. The structure, components and functions of the portable container 1$i$ of the seventh embodiment are mostly the same as those of the above-mentioned portable container 1$h$ of the sixth embodiment, so the detailed descriptions thereof will be omitted. The seventh embodiment and the sixth embodiment are different in the positions of the first opening of the first part of the lid structure. In this embodiment, the outer periphery of the annular wall 312$i$ comprises two first openings 3121 and 3121', which are arranged corresponding the first accommodating space S1 and the second accommodating space S2, respectively. The first openings 3121 and 3121' are arranged away from the partition portion 316$i$ (as shown in FIG. 7A). Particularly, in this embodiment, the first openings 3121 and 3121' are configured to allow the liquid L to follow from the containing portion 2 to the first accommodating space S1 and/or the second accommodating space S2. Moreover, if the first accommodating space S1 and/or the second accommodating space S2 contains excess liquid L, the excess part can flow back the inside of the containing portion 2 through the first openings 3121 and 3121'.

Referring to FIG. 7B, in this embodiment, the first part 31$i$ of the portable container 1$i$ can further comprise an edible gel layer 318$i$, wherein the edible gel layer 318$i$ is disposed on a surface of the first part 31$i$ facing the containing portion 2, or on a part of the surface of the first part 31$i$ other than the first accommodating space S1 and the second accommodating space S2. The edible gel layer 318$i$ is configured to prevent the first part 31$i$ from being softened due to contact with the liquid L for too long. In particular, any of the first parts 31, 31', 31$a$, 31$b$, 31$c$, 31$d$, 31$e$, 31$f$, 31$f'$, 31$g$ and 31$h$ in the above-mentioned embodiments may also include an edible gel layer. The edible gum layer can be made of animal gum, vegetable gum or microbial gum, and the ingredient can be, for example but not limited to, seaweed gum, acacia gum, glutinous rice gum, apple gum, corn syrup gum, xanthan gum, Gellan gum, gelatin, and shellac, or any of other edible gum ingredients known to those skilled in the art.

Figure 8A:
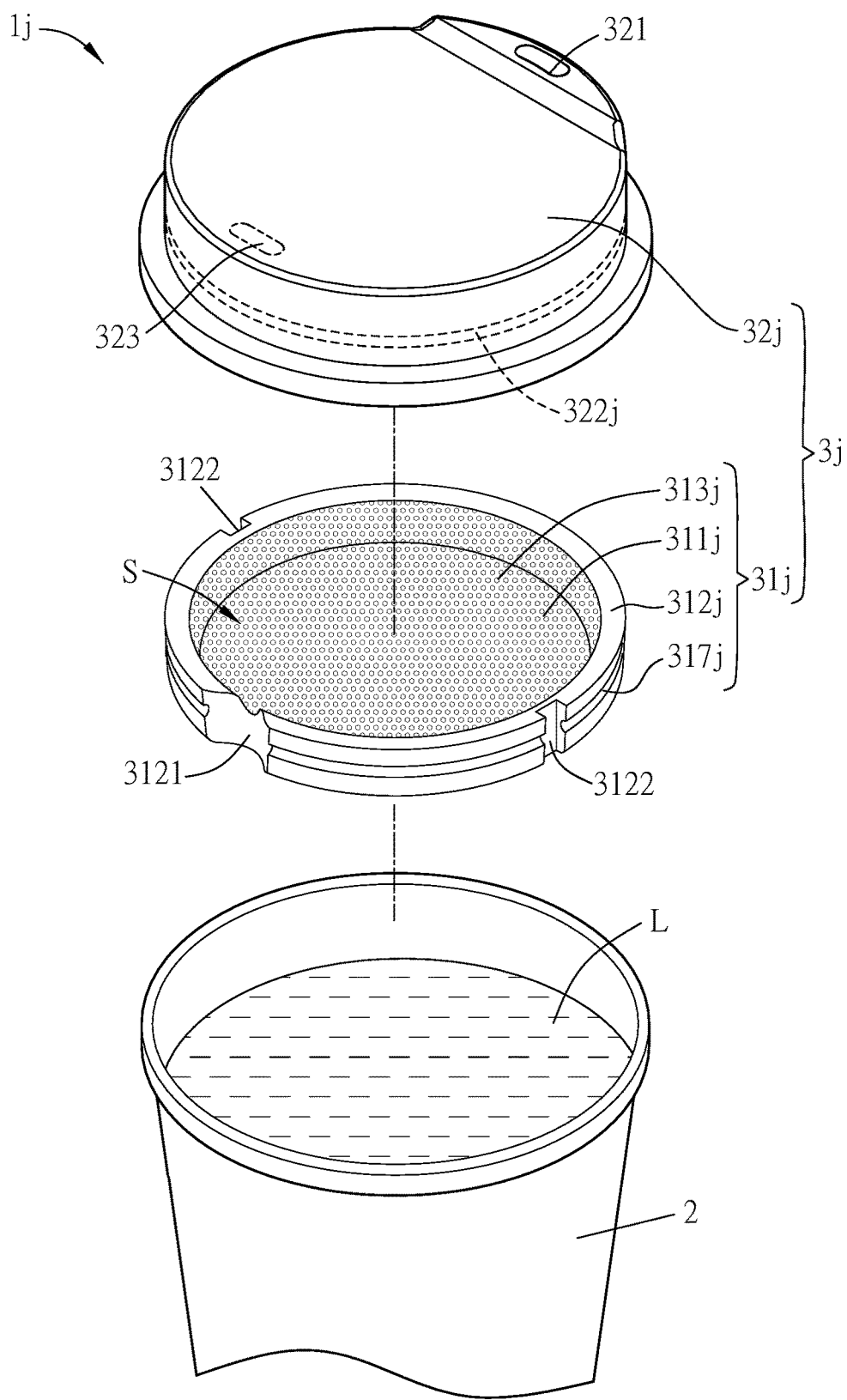
FIG. 8A is a schematic diagram showing a portable container according to an eighth embodiment of this disclosure, wherein the lid structure is applied to the containing portion.
Figure 8B:
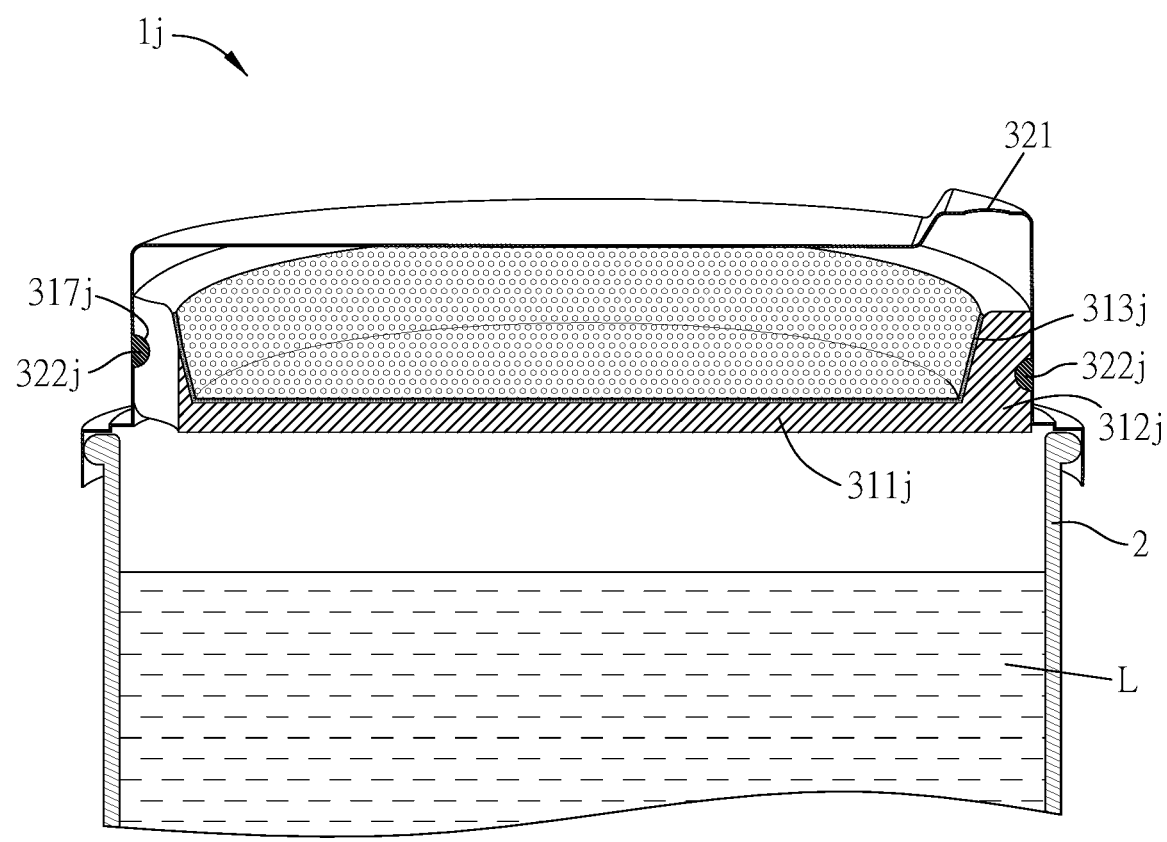
FIG. 8B is a sectional view of the assembled portable container of FIG. 8A.

Please refer to FIGS. 8A to 8B, wherein FIG. 8A is a schematic diagram showing a portable container according to an eighth embodiment of this disclosure, wherein the lid structure is applied to the containing portion, and FIG. 8B is a sectional view of the assembled portable container of FIG. 8A. The structure, components and functions of the portable container 1$j$ of the eighth embodiment are mostly the same as those of the above-mentioned portable containers 1, 1$d$, 1$e$, 1$f$, 1$g$, 1$h$ and 1$i$ of the above-mentioned embodiments, so the detailed descriptions thereof will be omitted. The eighth embodiment and the previous embodiments are different in the configuration of the lid structure. In the previous embodiments, the first part 31, 31', 31$a$, 31$b$, 31$c$, 31$d$, 31$e$, 31$f$, 31$f'$, 31$g$, 31$h$ or 31$i$ covers on the inner periphery of the containing portion 2 close to the rim of the containing portion 2, and then the second part 32 covers on the outer periphery of the rim. In this embodiment, the portable container 1$j$ comprises a containing portion 2 and a lid structure 3$j$. The first part 31$j$ connects to the inner surface of the second part 32$j$, and then the second part 32$j$ covers the outer periphery of the containing portion 2 close to the rim of the containing portion 2. For example, the first part 31$j$ has an engaging structure 317$j$, and the second part 32$j$ has a fastening structure 322$j$. The engaging structure 317$j$ and the fastening structure 322$j$ can be engaged with each other so as to connect the first part 31$j$ to the inner surface of the second part 32$j$. Afterwards, the second part 32$j$ is capped on the outer periphery of the rim. In particular, although FIGS. 8A and 8B show that the first part 31$j$ and the second part 32$j$ are connected by the engagement of the first part 31$j$ and the second part 32$j$, the first part 31$j$ and the second part 32$j$ can be connected by any of other methods such as hooking, screwing, embedding, riveting, adhering or the like, and this disclosure is not limited. In addition, when the first part 31, 31', 31$a$, 31$b$, 31$c$, 31$d$, 31$e$, 31$f$, 31$f'$, 31$g$, 31$h$ or 31$i$ is configured corresponding to the containing portion 2, the structural strength of the rim of the containing portion 2 can be enhanced. This configuration can prevent the deformation of the containing portion 2 when the portable container 1, 1$d$, 1$e$, 1$f$, 1$f'$, 1$g$, 1$h$, 1$i$ or 1$j$ is pressed during transportation, wherein the liquid L may leak from the rim once the containing portion 2 is deformed. In addition, the rim of the portable container 1, 1$d$, 1$e$, 1$f$, 1$f'$, 1$g$, 1$h$, 1$i$ or 1$j$ is provided with the first part 31, 31', 31$a$, 31$b$, 31$c$, 31$d$, 31$e$, 31$f$, 31$f'$, 31$g$, 31$h$ or 31$i$, and the second part 32 or 32$j$. This configuration can isolate the liquid L inside the containing portion 2 from the external environment, thereby remaining the temperature of the liquid L.

Referring to FIGS. 1A to 8B, each of the second parts 32 and 32$j$ of the above-mentioned embodiments has a puncture portion 323, which is disposed corresponding to the first opening 3121 (see FIG. 1A). In this embodiment, the puncture portion 323 and the third opening 321 are disposed at the opposite sides of the second part 32 or 32$j$, and it can be fabricated by forming a semi-cut line on the second part 32 or 32$j$. The position of the puncture portion 323 can correspond to the first opening 3121. Accordingly, the user can directly press the puncture portion 323 to form a complete opening, and then the liquid L in the containing portion 2 can be poured out through the puncture portion 323. Herein, the poured liquid L is not added with the flavor of the flavor portion 313, 313$a$, 313$b$, 313$c$, 313$d$, 313$e$, 313$f$, 313$f'$, 313$g$, 313$g'$, 313$h$, 313$h'$ or 313$j$, so that the user can enjoy the original flavor of the liquid L. Besides, after the puncture portion 323 is pressed to form a complete opening, it can provide a ventilation function for balancing the pressures inside and outside the containing portion 2. Accordingly, the liquid L inside the containing portion 2 can be easily poured out through the third opening 321.

As mentioned above, due to the design of the lid structure of this disclosure, the flavor and temperature of the beverage in the container can be adjusted. Thus, the drinker can drink different flavor beverages with the appropriate temperature by sips or batches, and this can increase the convenience of drinking. In addition, a part of the lid structure is edible, and the drinker can directly take it as a snack after drinking, which can add the fun to drinking. Moreover, the lid structure can be used to strengthen the structure of the portable container, prevent liquid from spilling out, and make it easier to carry.

The above description is only illustrative and not restrictive. Any equivalent modifications or changes made to the present invention without departing from the spirit and scope of the present invention shall be included in the scope of Claims.

What is claimed is:

1. A lid structure of a portable container, comprising:
an edible first part, wherein the first part comprises a bottom portion and an annular wall, the annular wall extends from a periphery of the bottom portion in a direction having an inclined angle with the bottom portion, the bottom portion and the annular wall form an accommodating space, and an outer periphery of the annular wall is configured with at least one first opening, wherein the first part further comprises at least one edible and soluble flavor portion, and the at least one edible and soluble flavor portion is provided on at least a part of an inner surface of the bottom portion and/or the annular wall facing the accommodating space.

2. The lid structure of claim 1, wherein the first part further comprises at least one recess portion, the at least one recess portion is formed on the inner surface of the bottom portion and/or the annular wall facing the accommodating space, and the at least one edible and soluble flavor portion is disposed in the at least one recess portion.

3. The lid structure of claim 1, wherein the first part further comprises a groove configured on at least a part of outer periphery of the annular wall away from the accommodating space and the bottom portion.

4. The lid structure of claim 1, wherein the first part further comprises a partition portion, the partition portion is configured on the inner surface of the bottom portion facing the accommodating space, and two ends of the partition portion connect to the annular wall for separating the accommodating space into a first accommodating space and a second accommodating space.

5. The lid structure of claim 4, wherein the first part comprises at least two edible and soluble flavor portions, and the at least two edible and soluble flavor portions are arranged in the first accommodating space and the second accommodating space, respectively.

6. The lid structure of claim 5, wherein the outer periphery of the annular wall is configured with a first opening, and the first opening is arranged corresponding to the partition portion; or the outer periphery of the annular wall is configured with two first openings, and the two first openings are arranged corresponding to the first accommodating space and the second accommodating space, respectively.

7. The lid structure of claim 1, wherein the outer periphery of the annular wall comprises at least one second opening.

8. The lid structure of claim 1, further comprising:
a second part, wherein the second part has a third opening, the second part covers the first part, the accommodating space opens toward the second part, and the at least one first opening and the third opening are located at opposite sides of the bottom portion, respectively.

9. The lid structure of claim 1, further comprising:
a second part, wherein the second part has a third opening, the second part covers the first part, the accommodating space opens toward the second part, and the at least one first opening and the third opening are located at opposite sides of the bottom portion, respectively.

10. The lid structure of claim 2, further comprising:
a second part, wherein the second part has a third opening, the second part covers the first part, the accommodating space opens toward the second part, and the at least one first opening and the third opening are located at opposite sides of the bottom portion, respectively.

11. The lid structure of claim 3, further comprising:
a second part, wherein the second part has a third opening, the second part covers the first part, the accommodating space opens toward the second part, and the at least one first opening and the third opening are located at opposite sides of the bottom portion, respectively.

12. The lid structure of claim 4, further comprising:
a second part, wherein the second part has a third opening, the second part covers the first part, the accommodating space opens toward the second part, and the at least one first opening and the third opening are located at opposite sides of the bottom portion, respectively.

13. The lid structure of claim 5, further comprising:
a second part, wherein the second part has a third opening, the second part covers the first part, the accommodating space opens toward the second part, and the at least one first opening and the third opening are located at opposite sides of the bottom portion, respectively.

14. The lid structure of claim 6, further comprising:
a second part, wherein the second part has a third opening, the second part covers the first part, the accommodating space opens toward the second part, and the at least one first opening and the third opening are located at opposite sides of the bottom portion, respectively.

15. The lid structure of claim 7, further comprising:
a second part, wherein the second part has a third opening, the second part covers the first part, the accommodating space opens toward the second part, and the at least one first opening and the third opening are located at opposite sides of the bottom portion, respectively.

* * * * *